Dec. 19, 1967   D. F. ROXBURGH ET AL   3,358,561
AUTOMATIC PATTERN CUTTING AND VENDING MACHINE
Filed Oct. 21, 1965                                22 Sheets-Sheet 2

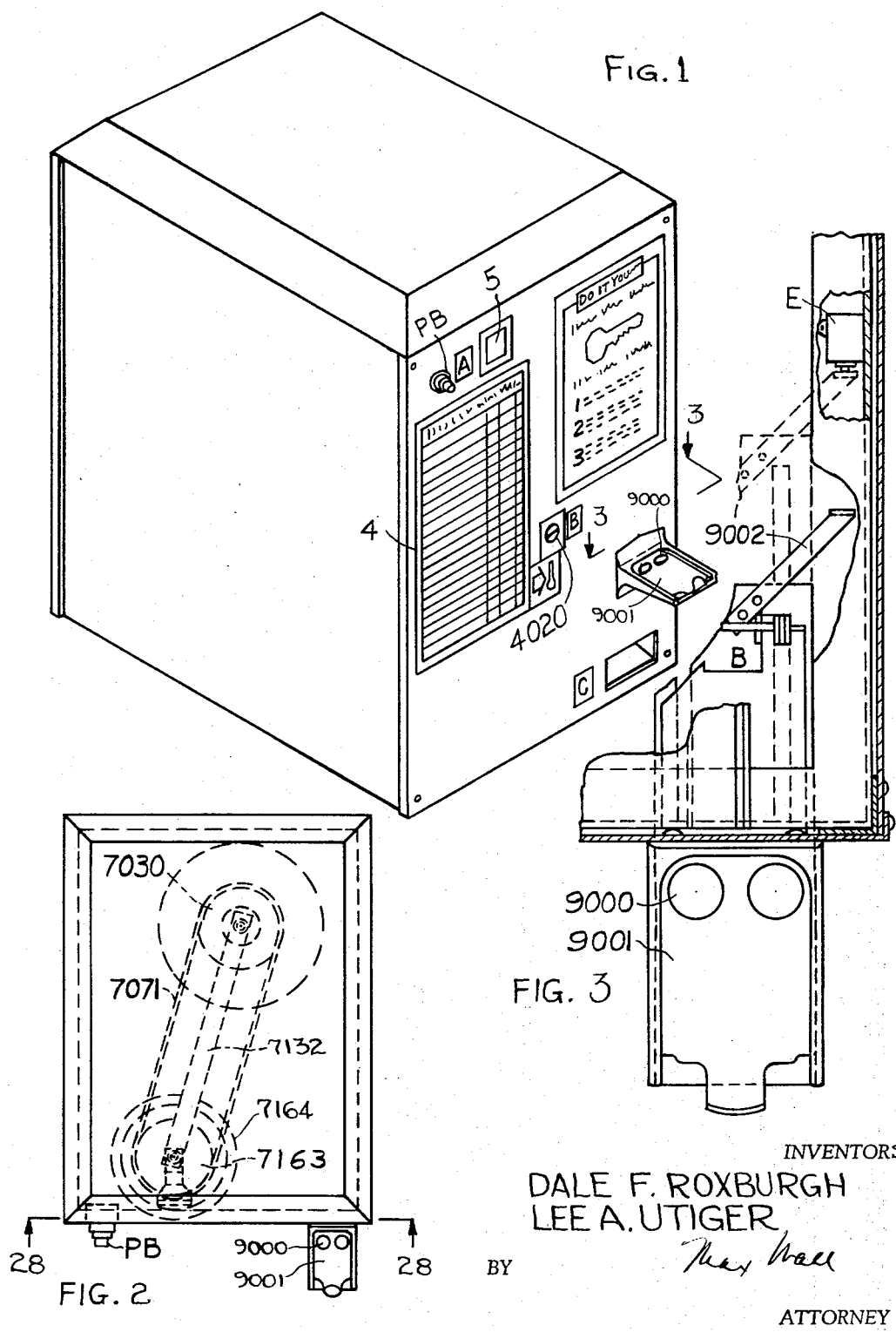

INVENTORS
DALE F. ROXBURGH
LEE A. UTIGER

BY

ATTORNEY

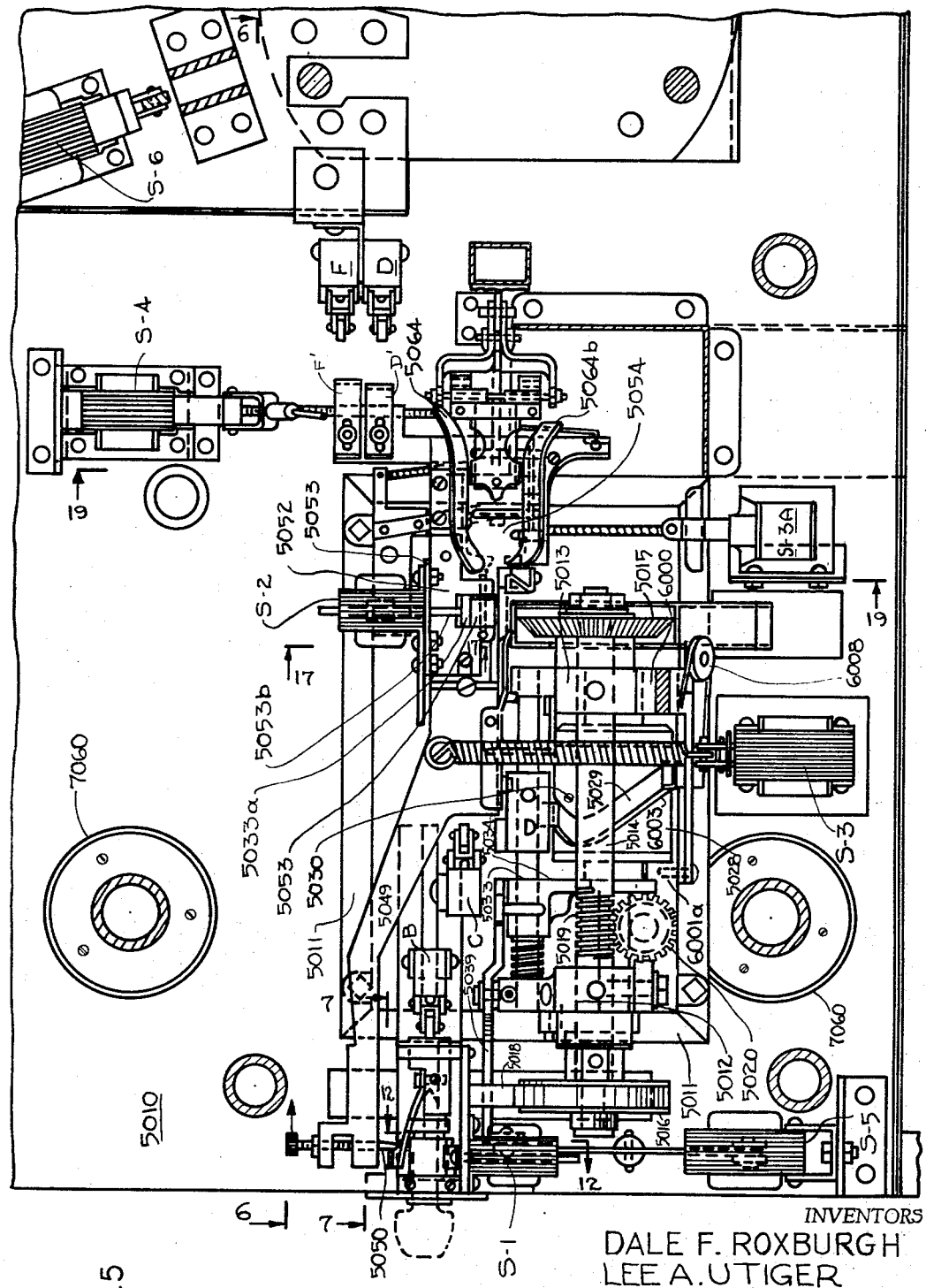

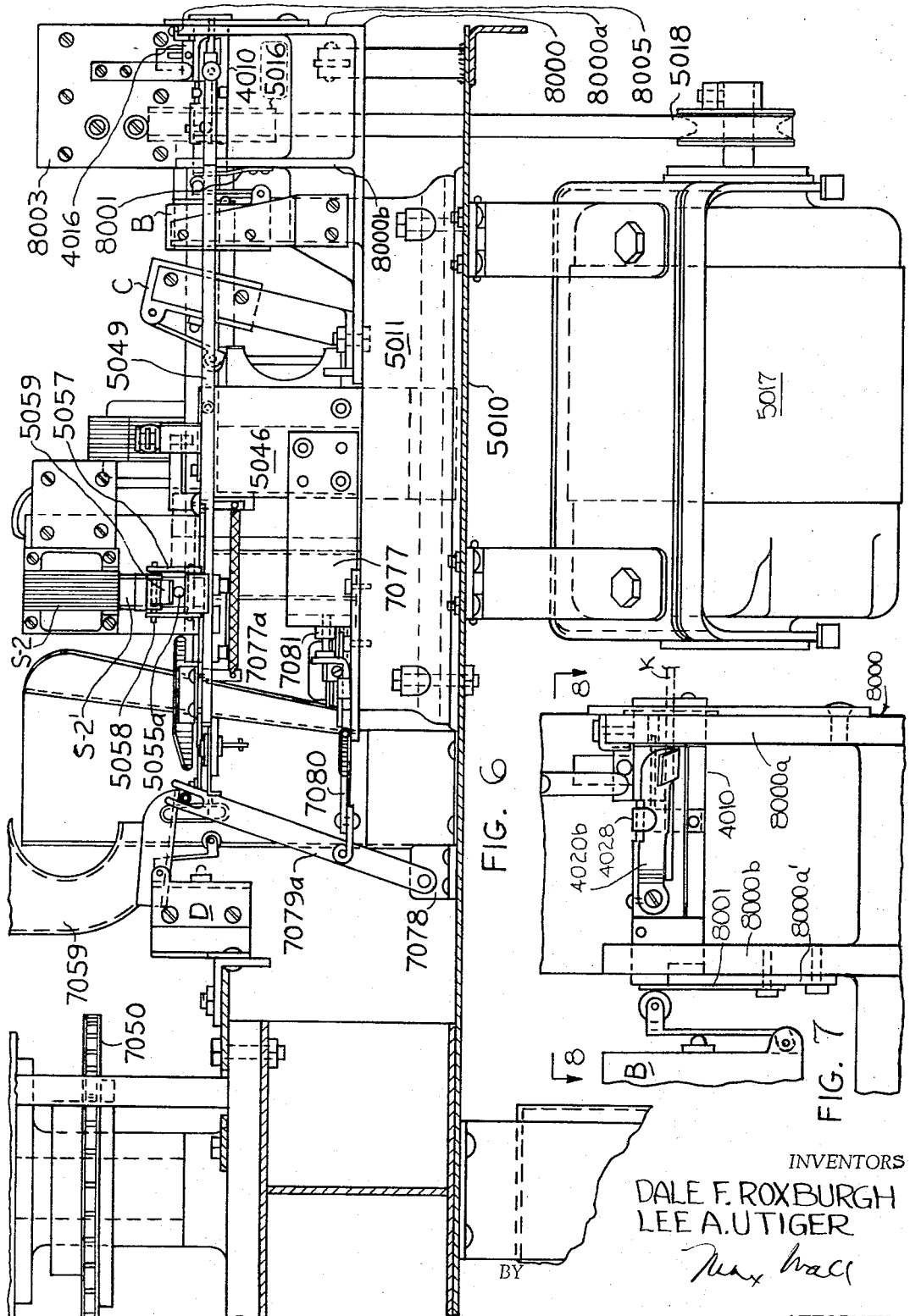

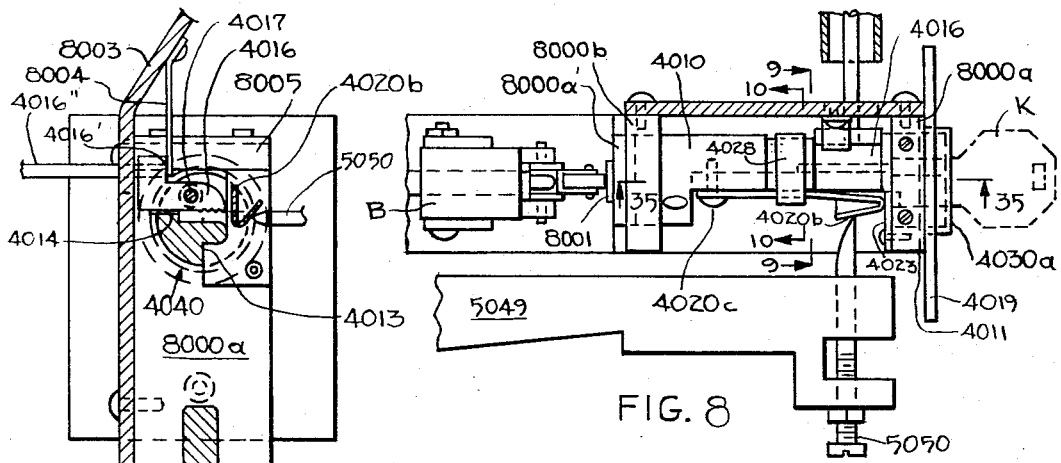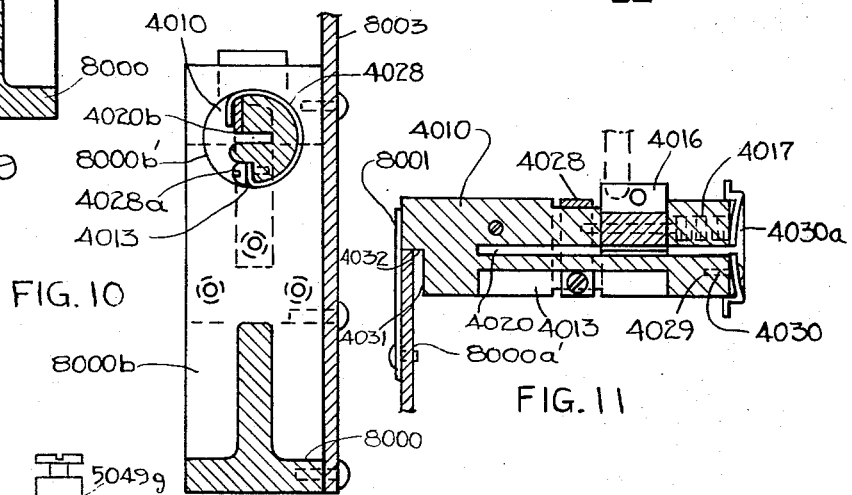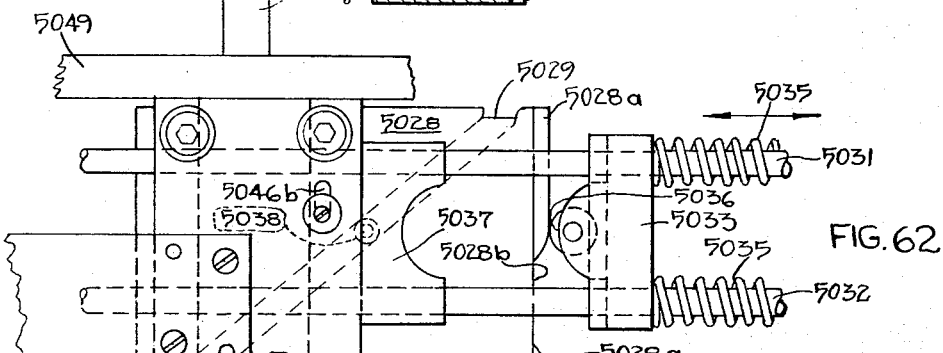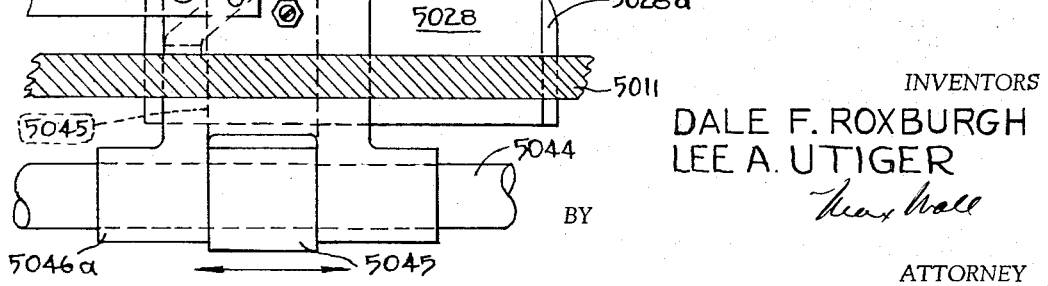

INVENTORS
DALE F. ROXBURGH
LEE A. UTIGER

ATTORNEY

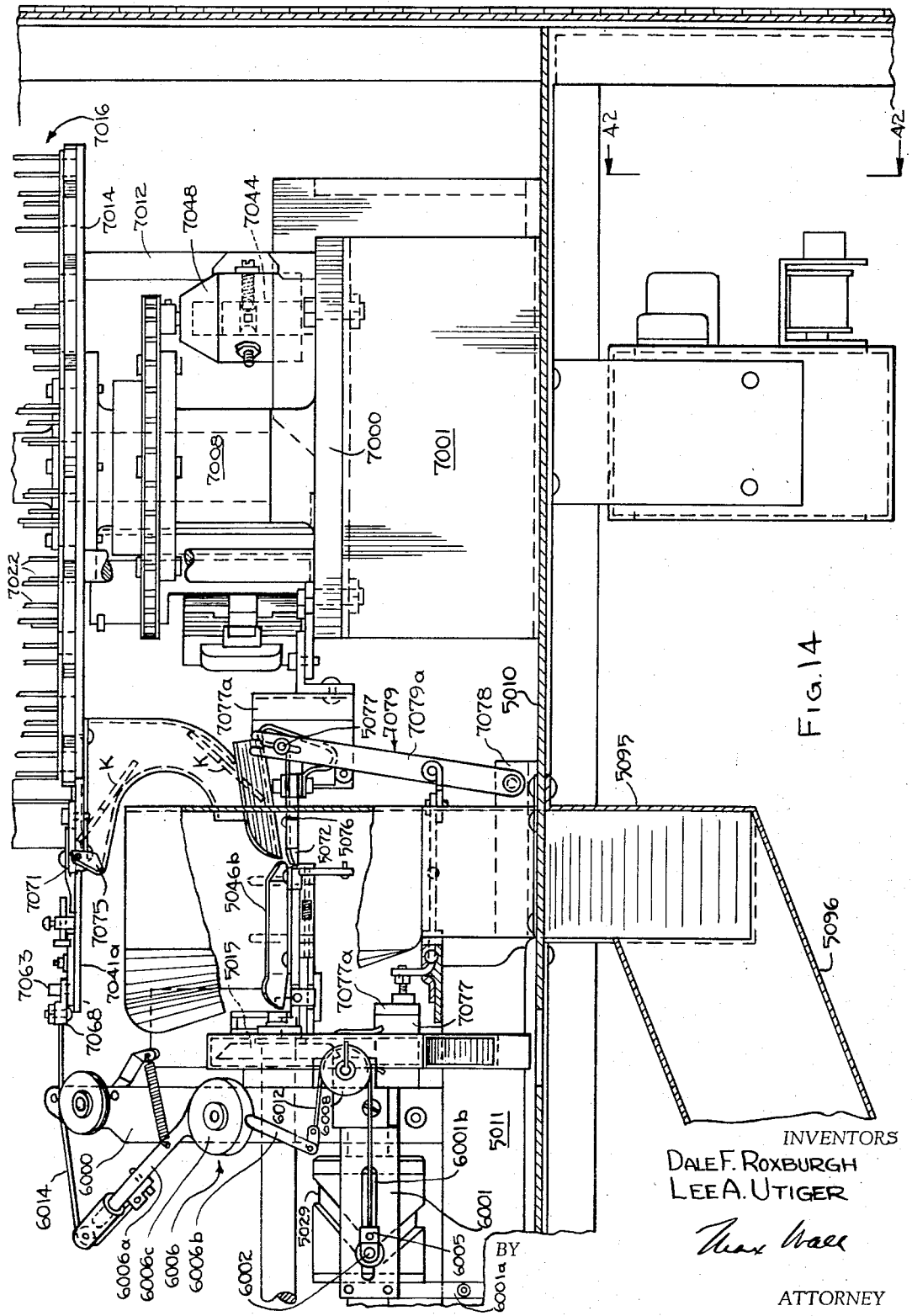

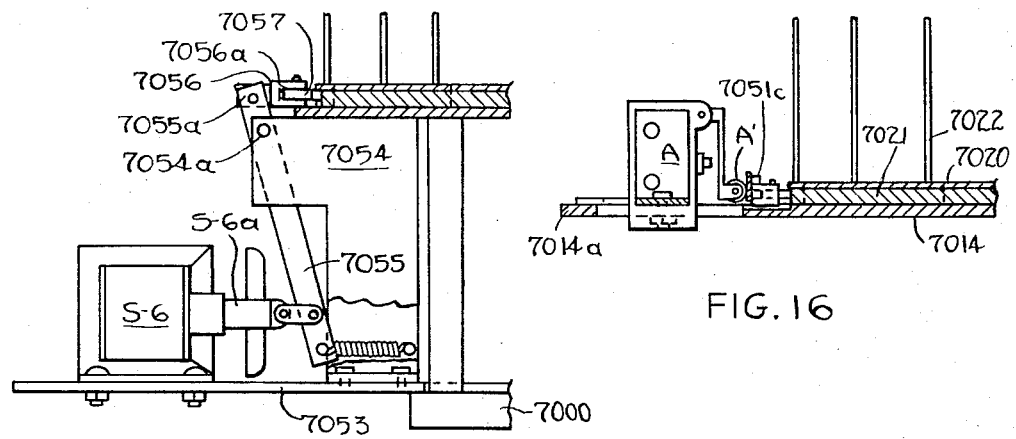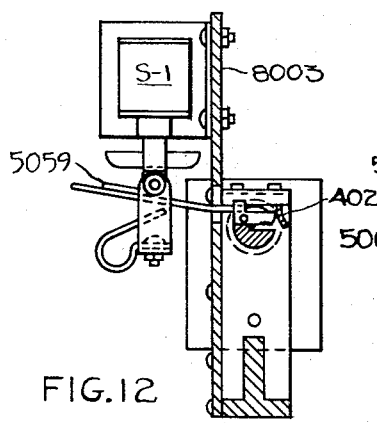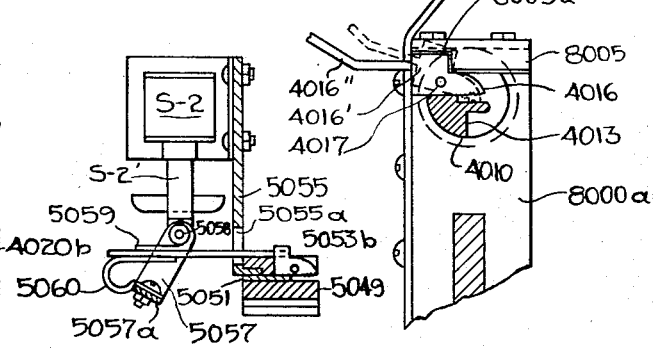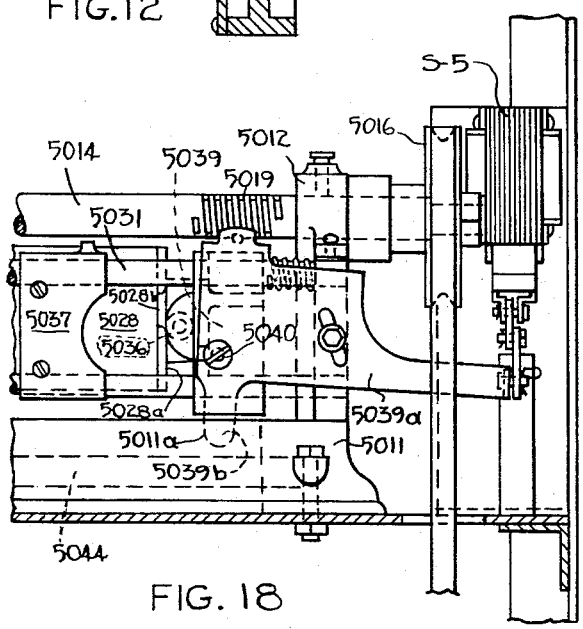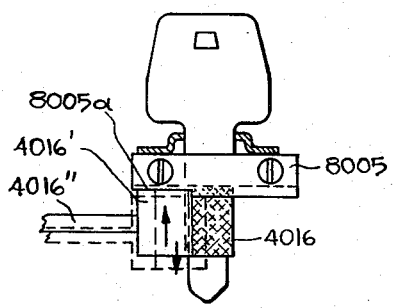

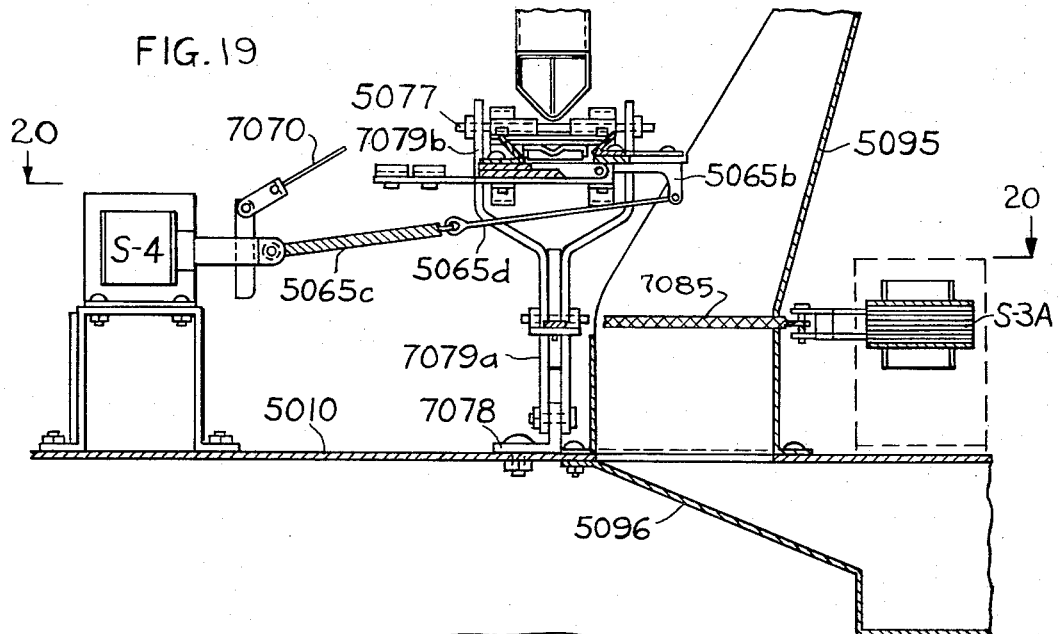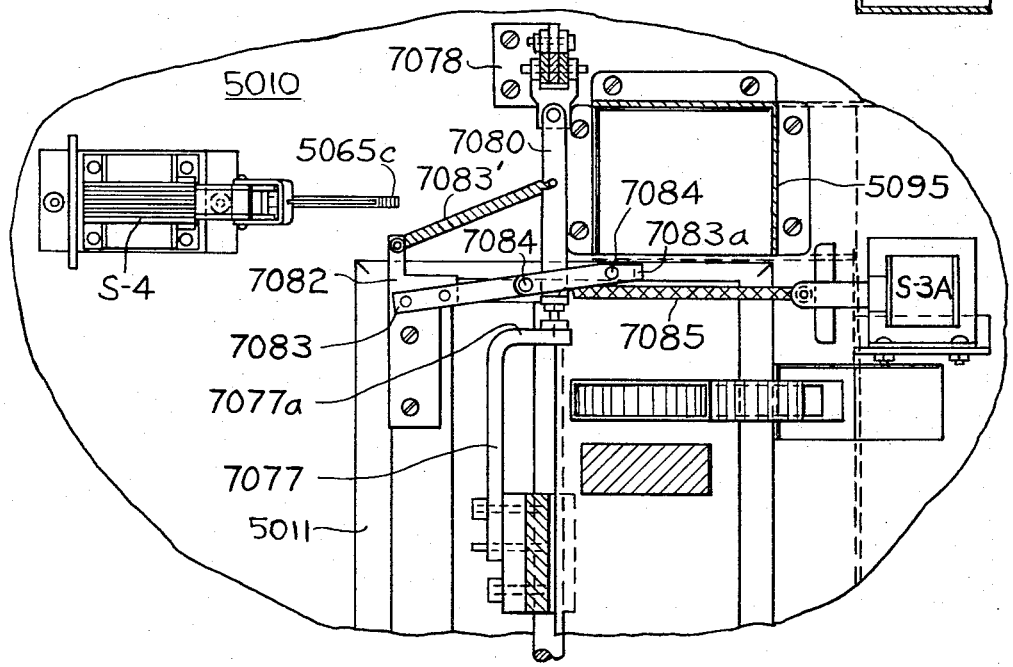

Dec. 19, 1967 D. F. ROXBURGH ET AL 3,358,561
AUTOMATIC PATTERN CUTTING AND VENDING MACHINE
Filed Oct. 21, 1965 22 Sheets-Sheet 10

INVENTORS
DALE F. ROXBURGH
LEE A. UTIGER

BY

ATTORNEY

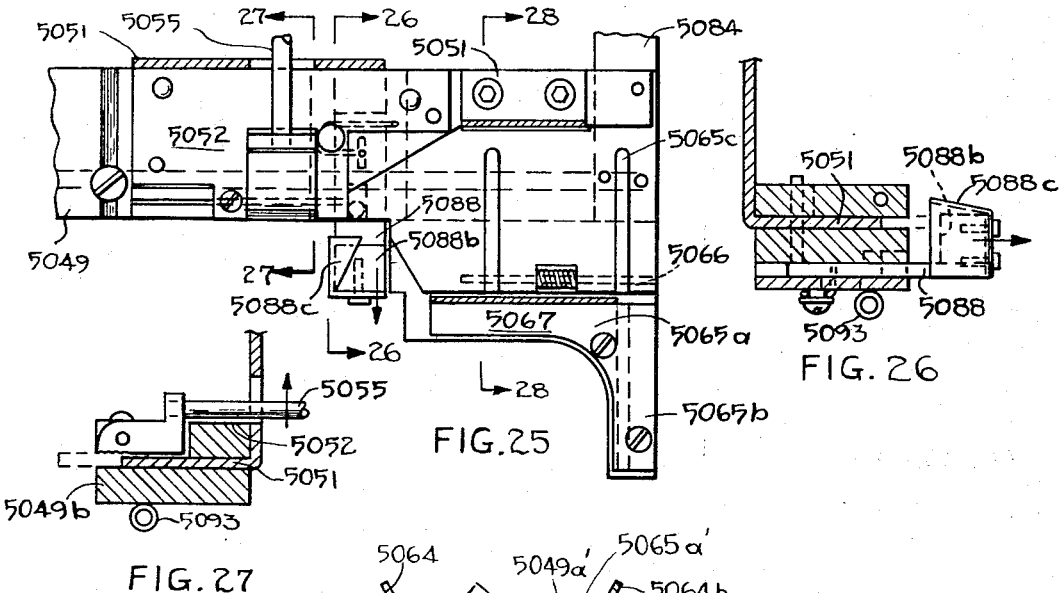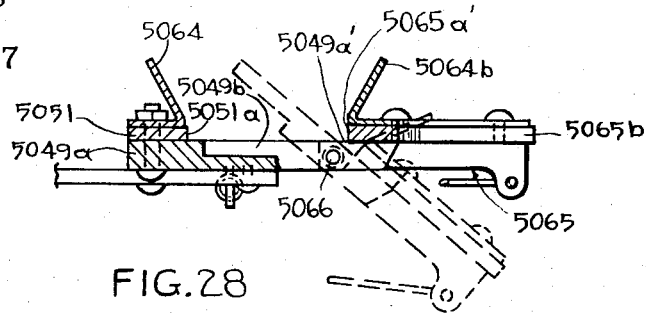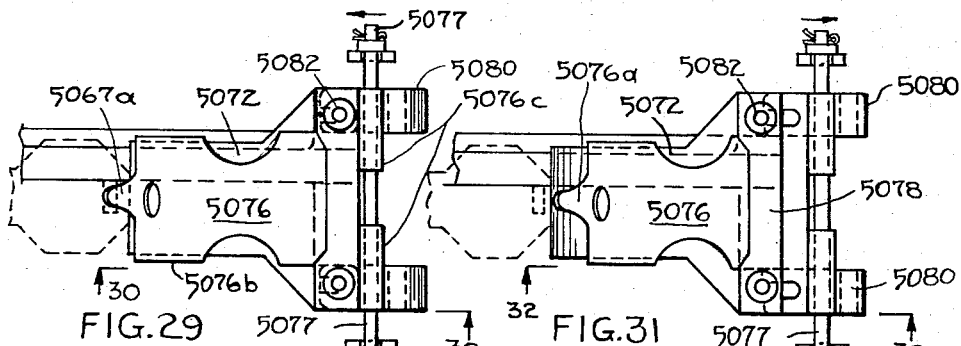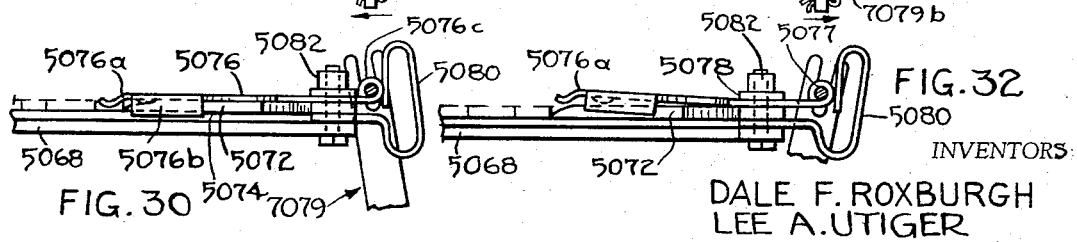

Dec. 19, 1967   D. F. ROXBURGH ETAL   3,358,561
AUTOMATIC PATTERN CUTTING AND VENDING MACHINE
Filed Oct. 21, 1965   22 Sheets-Sheet 13

INVENTORS
DALE F. ROXBURGH
LEE A. UTIGER

BY

ATTORNEY

Dec. 19, 1967     D. F. ROXBURGH ET AL     3,358,561
AUTOMATIC PATTERN CUTTING AND VENDING MACHINE
Filed Oct. 21, 1965     22 Sheets-Sheet 14

INVENTORS
DALE F. ROXBURGH
LEE A. UTIGER

BY

ATTORNEY

INVENTORS
DALE F. ROXBURGH
LEE A. UTIGER

ATTORNEY

Dec. 19, 1967  D. F. ROXBURGH ET AL  3,358,561
AUTOMATIC PATTERN CUTTING AND VENDING MACHINE
Filed Oct. 21, 1965  22 Sheets-Sheet 16

INVENTORS
DALE F. ROXBURGH
LEE A. UTIGER

BY

ATTORNEY

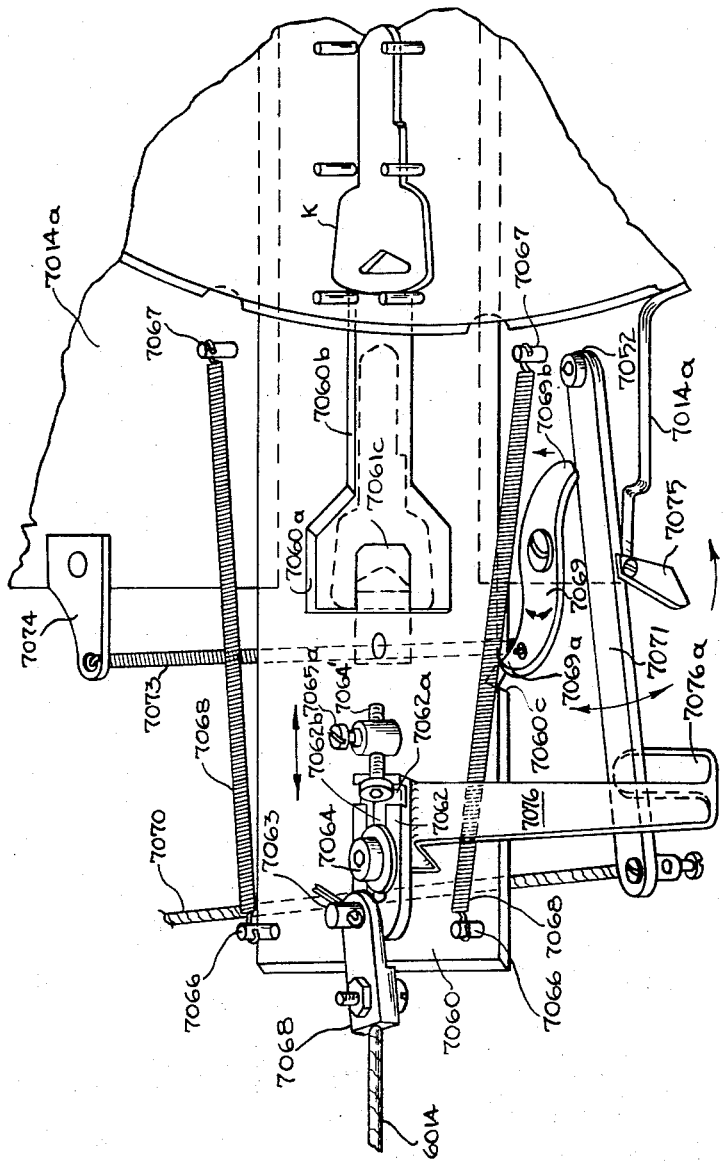

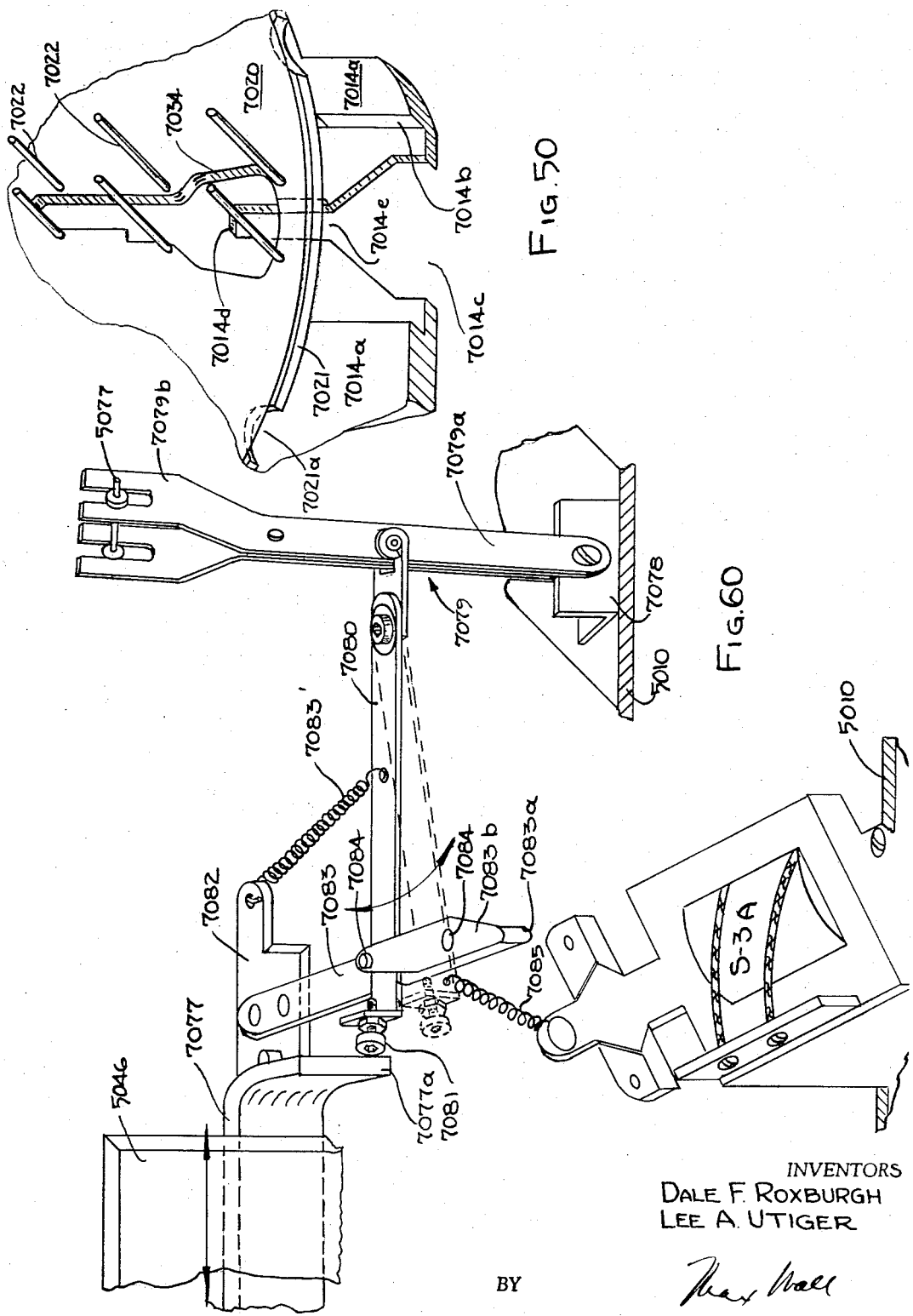

Dec. 19, 1967 D. F. ROXBURGH ETAL 3,358,561
AUTOMATIC PATTERN CUTTING AND VENDING MACHINE
Filed Oct. 21, 1965 22 Sheets-Sheet 19
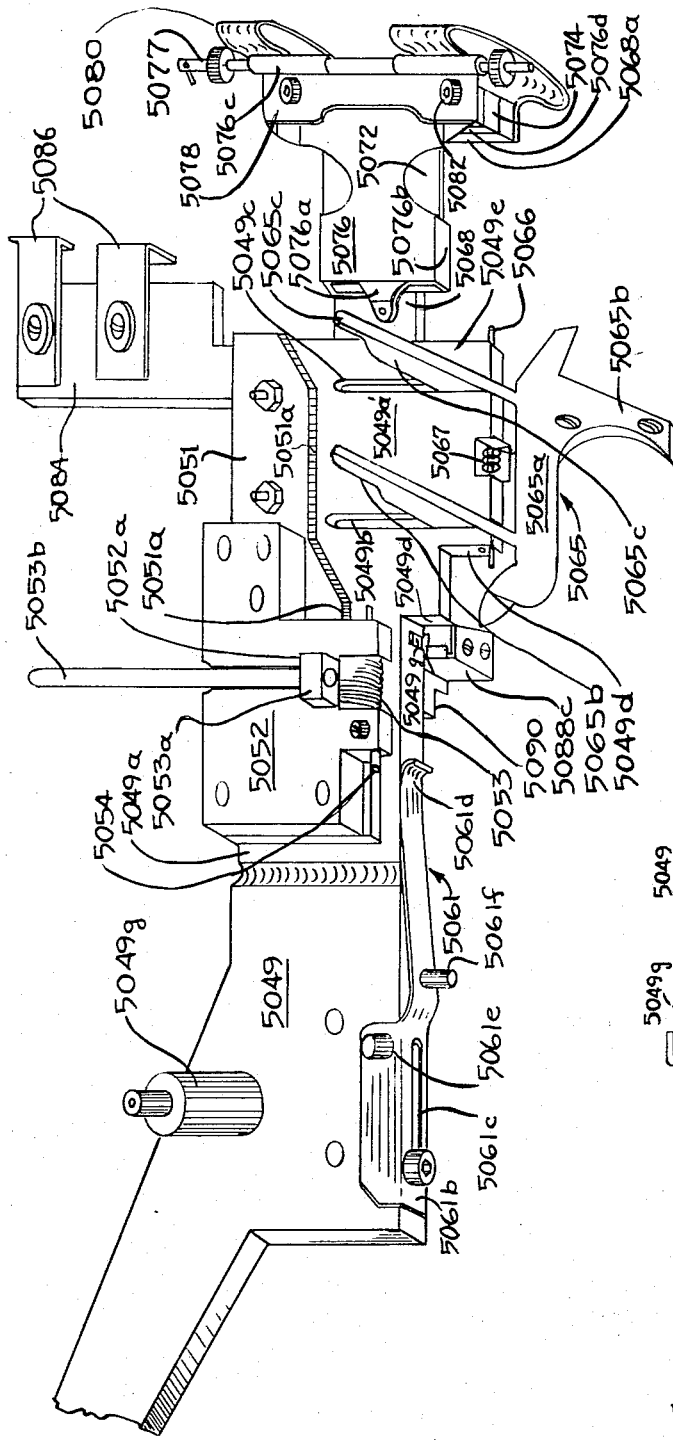
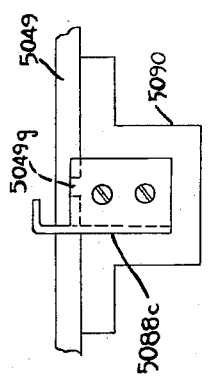
INVENTORS
DALE F. ROXBURGH
LEE A. UTIGER
BY
ATTORNEY Dec. 19, 1967  D. F. ROXBURGH ETAL  3,358,561
AUTOMATIC PATTERN CUTTING AND VENDING MACHINE
Filed Oct. 21, 1965  22 Sheets-Sheet 21
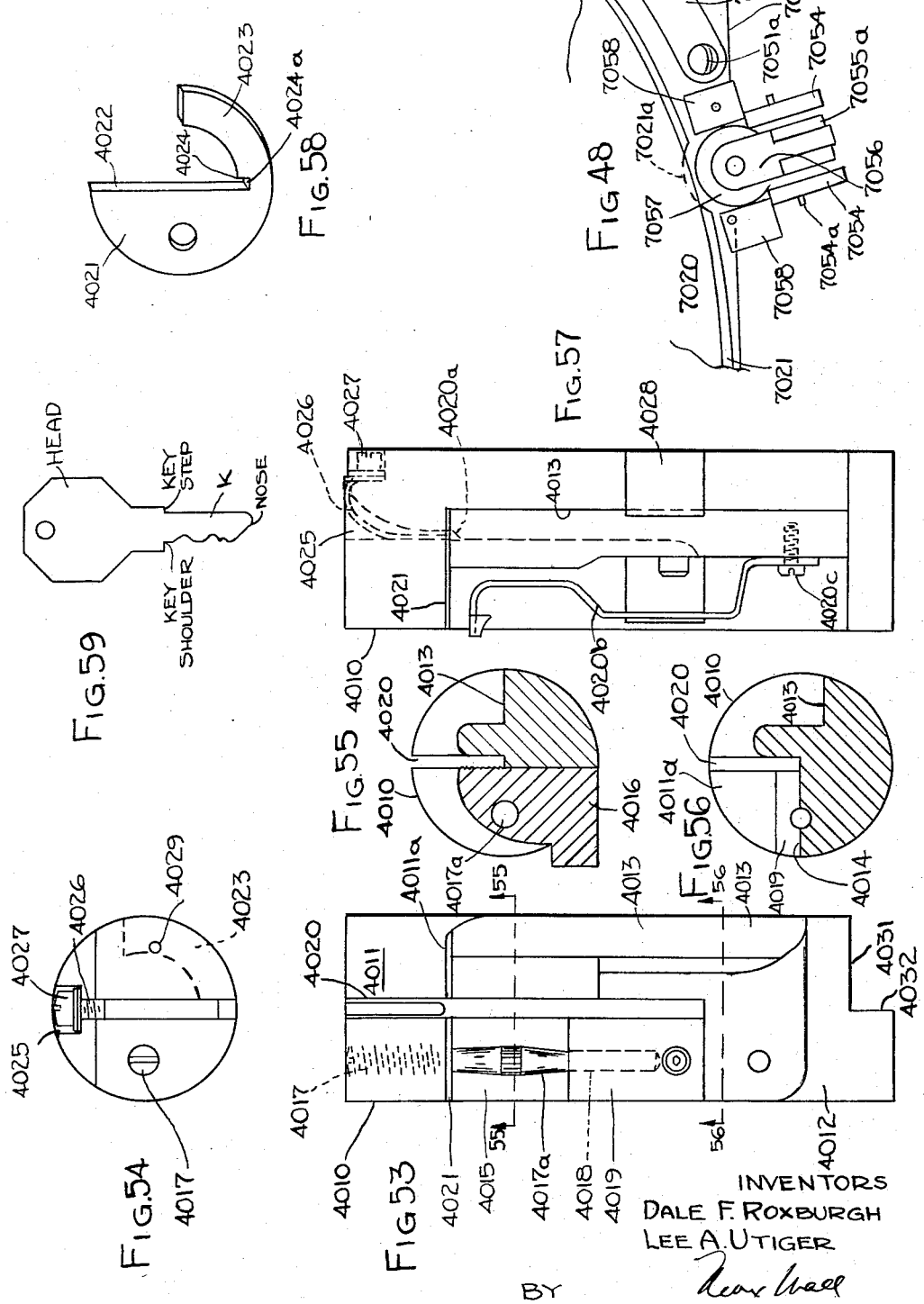
INVENTORS
DALE F. ROXBURGH
LEE A. UTIGER
BY
ATTORNEY United States Patent Office 3,358,561
Patented Dec. 19, 1967

3,358,561
**AUTOMATIC PATTERN CUTTING
AND VENDING MACHINE**
Dale F. Roxburgh, and Lee A. Utiger, Omaha, Nebr., assignors, by mesne assignments, to Coin-A-Key, Inc., Omaha, Nebr., a corporation of Nebraska
Filed Oct. 21, 1965, Ser. No. 499,327
14 Claims. (Cl. 90—13.05)

ABSTRACT OF THE DISCLOSURE

A pattern duplicating machine which stores selected blanks for patterns, such as cylinder keys, for duplication at customer initiation. Upon insertion of the customer's pattern (or key) into an appropriate mechanism of the machine, forces are set into motion automatically: (1) enabling the customer to select the proper blank for his key pattern from storage, (2) present it to a cutting means and to cut it to correspond to the customer's pattern, and (3) to deliver the cut blank and release the pattern to the customer. The machine is a coin operated vending machine.

---

This invention relates to pattern duplicating machines, and more particularly to coin controlled, customer operated pattern duplicating and vending machines, in which the customer inserts a pattern to be duplicated into the machine, selects the blank from which it is to be made from a supply stored in the machine, and the machine thereupon operates automatically, after the deposit of a coin, to reproduce the pattern of the workpiece inserted into the machine, and then delivers the duplicate workpiece and releases the original pattern to the customer.

Any type of workpiece, template, or pattern which has a longitudinally extending, edgewise disposed series of notches, indentations or irregular surfaces which can be traced by a sensing finger or stylus can be duplicated in a machine according to this invention.

The particular type of workpiece selected to illustrate a practical embodiment of the invention is a key, and more particularly, an automobile key for the various makes of automobiles which are operated at the present time.

Since there are an infinite number of key types and key patterns, the disclosure of the present invention, for illustrative purposes only, has been limited to one particular type of key, the cylinder lock type of key in which the tumblers of the lock fall into the indentations cut into an edge of the key, whereby the exposed ends of the tumblers fall into alignment with the periphery of the cylinder, enabling the cylinder to be turned by the proper key to open the lock.

It is a particular object of this invention to provide a machine having a storage turret for storing stacks of different selected blank keys of the type currently in use in the popular makes of automobiles, to provide means for enabling a customer to select from the blanks stored in the turret the particular blank desired to match his key to be duplicated, to have the machine deliver said blank from the turret to a cutting apparatus after the selection has been made, and to complete the cutting thereof and deliver the key to the customer, after the deposit in the machine of the indicated price for the blank and the service performed by the machine.

Another object is to provide, in a machine of the kind described, a tracer bar which carries a stylus or sensing finger at one end for sensing the pattern of the customer's key, having a table and clamp means at the other end for clamping the blank key to be duplicated, the blank key being presented to a stationary cutting member synchronously with the sensing of the pattern, as the tracer bar is guided in reciprocating movement by a driving means.

Another object is to provide a novel key clamping mechanism which clamps and locks the customer's key so that it cannot readily be withdrawn or moved until the cutting cycle is completed.

A further object is to provide novel means for positively locking the key storage turret after a key blank has been selected for delivery, and for unlocking it after a cycle of operation has been completed.

Still a further object is to provide means for the correct positioning of the pattern key and blank key in relation to one another to insure exact duplication of the pattern key.

The various operations of receiving and clamping the customer's key, selecting the key blank, delivering it to the clamping mechanism and cutting the duplicate blank, and finally ejecting the duplicate key are carried out by means of a series of electrical controls, actuated in a sequence by means of which the completion of one operation triggers the initiation of the next operation throughout a complete cycle. This machine is an improvement over the machine disclosed in an application Ser. No. 155,535, filed Nov. 24, 1961, by Dale F. Roxburgh, now Patent No. 3,323,420, dated June 6, 1967.

Other objects will become apparent from the following description taken in connection with the accompanying drawings, in which:

FIG. 1 is a perspective view of the machine enclosed in a housing;

FIG. 2 is a plan view of the same with parts shown in phantom;

FIG. 3 is a partial plan view of the coin control mechanism and the microswitch actuated thereby, showing a section of the machine taken along the line 3—3 of FIG. 1;

FIG. 5 is a partial plan view of the machine, only a portion of the key turret mechanism being shown, taken on the line 29—29 of FIG. 4;

FIG. 6 is a side elevation of the machine taken from the left side of FIG. 5 along the line 6—6;

FIG. 7 is a detail side elevational view of the customer key receiver and the microswitch actuated thereby, taken along the line 7—7 of FIG. 5;

FIG. 8 is a detail in plan view of the customer key receiver and the microswitch actuated thereby together with a portion of the tracer bar and the sensing finger, taken along the line 8—8 of FIG. 7;

FIG. 9 is a transverse vertical section taken through FIG. 8 along the line 9—9;

FIG. 10 is a transverse vertical section taken along the line 10—10 of FIG. 8;

FIG. 11 is a longitudinal, vertical section taken along the line 11—11 of FIG. 8;

FIG. 12 is a detail of the customer key clamp with its actuating solenoid;

FIG. 12a is a detail of the same key clamp, showing its dual positions;

FIG. 12b is a detail of the same in plan view showing a key in position;

FIG. 14 is a side elevation taken from the right side of FIG. 13 showing the mechanism for actuating the key blank withdrawal slide;

FIG. 15 is an elevational detail of the key turret positioning lock, with parts in section;

FIG. 16 is a detail of the key turret positioning microswitch, taken along the line 16—16 of FIG. 13;

FIG. 17 is a detail of the duplicate key clamp in the open position, with its actuating solenoid in its deenergized position, taken along the line 17—17 of FIG. 5;

FIG. 18 is an elevational detail of the clutch engaging mechanism and the solenoid for actuating same;

FIG. 19 is a detail, partly in elevation and partly in section, showing the key slide mechanism and the finished duplicate key ejecting slide and the discharge chute;

FIG. 20 is a detail in plan view of a portion of the mechanism for controlling the movement of the key ejecting slide;

FIG. 25 is a detail in plan view of the duplicate, or blank key, receiving and discharging table;

FIG. 26 is a transverse sectional view taken in the direction of the arrows along the line 26—26 of FIG. 25;

FIG. 27 is a similar sectional view taken along the line 27—27 of FIG. 25;

FIG. 28 is a similar sectional view taken along the line 28—28 of FIG. 25, with the ejecting portion of the table in ejecting position;

FIG. 29 is a detail in plan view of the duplicate key pusher and withdrawal mechanism, showing the pusher in an advanced, key engaging position;

FIG. 30 is a side elevational view taken along the line 30—30 of FIG. 29;

FIG. 31 is a detail in plan view, similar to FIG. 29, but showing the pusher in withdrawn position, prior to or after engagement with a blank or finished key;

FIG. 32 is a side elevational view taken along the line 32—32 of FIG. 31;

FIG. 48 is a detail in plan view of the indexing mechanism for the turret;

FIG. 49 is a perspective detail of the mechanism for withdrawing a blank key from the turret;

FIG. 50 is a perspective detail of the turret key slot and key delivery slide slot below the turret;

FIG. 51 is a perspective view of the tracer bar, looking at the upper face thereof;

FIG. 51a is an enlarged detail in elevation of a portion of FIG. 51;

FIG. 53 is a plan view of the customer's key receiver;

FIG. 54 is a front elevational view thereof;

FIG. 55 is a vertical sectional view taken along the line 55—55 of FIG. 53;

FIG. 56 is a similar view taken along the line 56—56 of FIG. 53;

FIG. 57 is an elevational view of a side of the customer key receiver, rotated 90° from the position shown in FIG. 53;

FIG. 58 is a perspective view of a thickness gauge or key spacer which is carried by the key receiver;

FIG. 59 is a plan view of the workpiece or pattern of the nature made by the present invention;

FIG. 60 is a perspective view of the stop mechanism controlling the operation of the key slide;

FIG. 62 is an enlarged elevational detail of the operating cam and its associated mechanism.

Figure 4:
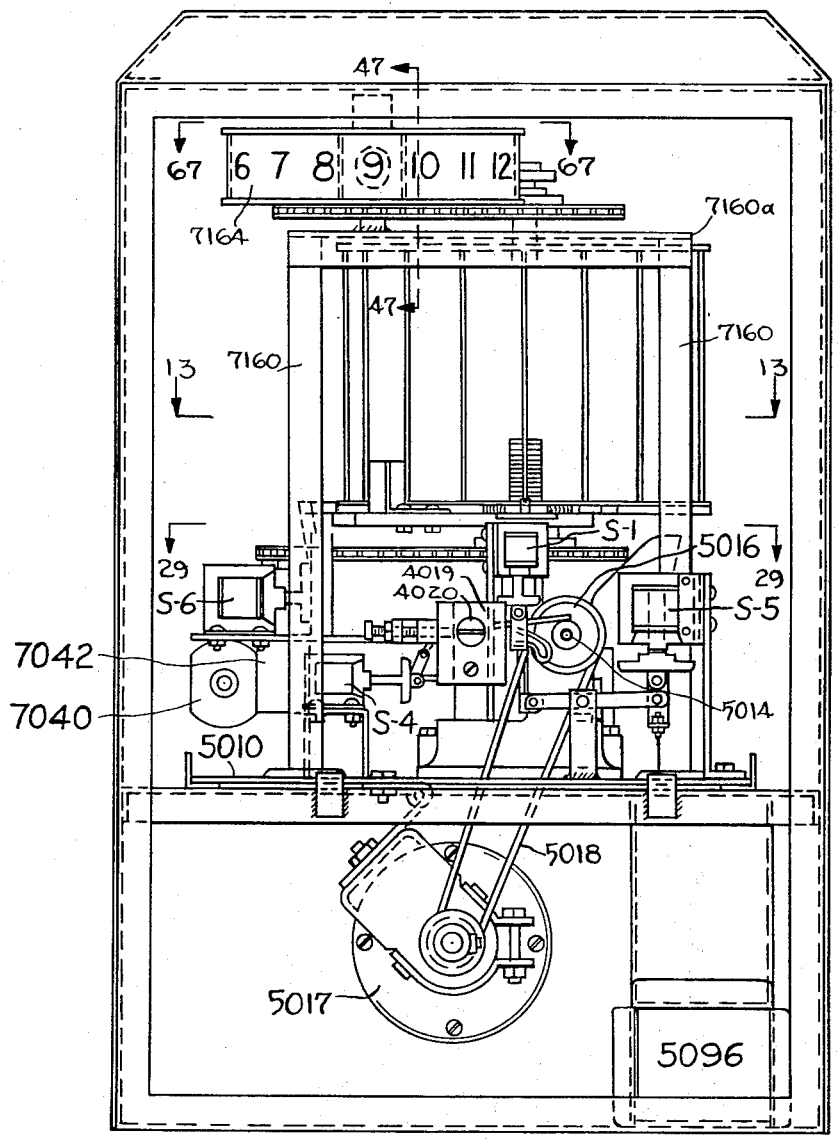
FIG. 4 is a front elevation of the machine with the cover plate removed.

The machine is mounted upon a base 5010, FIGS. 4, 5, and 6, and comprises a number of correlated mechanical assemblies, the assemblies being identified as follows for the purpose of this description:

Key Receiver Mechanism
Basic Cutting Unit
Tracer Bar, Sensing Means and Blank Key Feeding Mechanism
Blank Key Storage Turret
Key Slide Withdrawal Mechanism

KEY RECEIVER MECHANISM

The key receiving mechanism, FIGS. 8, 53–57, comprises an element 4010 of generally cylindrical shape having a forward head portion 4011 and a rearward portion 4012. The space between the two head portions is undercut or milled out to provide a rabbetted portion 4013, FIG. 55, on one side of the longitudinal axis of the member 4010 and a flat surface 4014, FIG. 56, on the other side of said longitudinal axis. A portion of the body 4010 is cut away as at 4015, FIG. 53, to provide space for the insertion of a clamping jaw 4016, FIGS. 9, 11, 55, which is pivoted on a screw 4017 inserted from the end face of the member 4010 as shown in FIG. 53, the leading end of the screw 4017 being supported in a bearing slot 4018, FIG. 53, cut in the upper portion of the face 4014 and this leading end is locked in position by clamping plate 4019, FIG. 8. It will be observed that the portion of the screw 4017 which functions as a pivot for the clamping jaw has its greatest diameter at a point midway between the width of the clamping jaw and is tapered at 4017a for a portion of its length in each direction from said midpoint. This gives the clamping jaw a slight rocking and floating action on its pivot 4017 which permits the jaw to accommodate itself readily to the object or workpiece to be clamped even though there may be imperfections in said object, which in this instance is a cylinder type key.

The head portion 4011 of the cylinder 4010 is slotted radially as at 4020, the slot extending rearwardly through the body of the element for a length substantially greater than the length of the bit portion of a conventional cylinder type key, forming the key slot of said key cylinder.

A disc key stop member 4021, FIG. 58, is mounted on the cylinder 4010 and is disposed in abutting relation to the inner face 4011a, FIG. 53, of the head 4011. This disc has a diameter substantially coincident with that of the cylinder 4010 but has a large portion of its surface cut away to provide a vertical wall portion 4022 and a circular segment 4023 formed so as to accommodate itself to the conformation of the body of the member 4010 at the point of its insertion. A notch 4024 is formed in said disc at the juncture of said vertical wall and segment. This vertical wall 4022 is arranged to coincide with one wall of the key slot 4020, and the bottom wall 4024a of the notch extends into and across the upper portion of the key slot to form a stop for the shoulder on the key. The disc is mounted between the head 4011 and one end of the clamp 4016. A notch 4020a, FIG. 57, is cut into the bottom of the key slot to accommodate the step of some keys which have a step substantially midway of the key stem.

A slot 4025, FIGS. 54–57, is cut into the bottom of body 4010 at its forward portion to accommodate a leaf spring 4026 which is bent forwardly into the bottom of the key slot, the spring being retained in the slot by a screw 4027. The purpose of this is to insure that when the key is inserted into the slot, the spring 4026 will bear against the key stem or shank and guide it into the key slot so that it will not get its point caught in said notch 4020a.

Another leaf spring 4020b FIG. 57, fastened in the cutaway portion of the body 4010 and is held pivotally in place by a screw 4020c, the spring extending over the key slot 4020 so as to bear against the shank of any key in the slot and hold it against the rear wall of the slot. This spring is stronger than the spring 4026 so that it will counteract any tendency of the latter to force the key stem out of the bottom of the slot. The body 4010 is encircled by another leaf spring 4028, FIG. 57, one end 4028a of which is hooked to the cylinder and the rest of which is wrapped around the body, engaging the flat portion 4013, passing around cylinder 4010 and passing over the leaf spring 4020b at its other end to normally urge said leaf spring 4020b over the center of the key slot 4020 where it will bear against any key in said slot. Being pivoted, the spring 4020b will yield against the pressure of the sensing finger as the later moves into engagement with the key.

At its front end, the key cylinder is provided with a hole 4029, FIG. 54, at one side of the key slot. This is provided to accommodate the pin 4030, FIG. 11, which is integrally attached to a key cylinder cap 4030a to insure alignment of its slot with that of the key slot in its cylinder. The end 4012 of said key receiver has a portion of its surface cut away to provide an angular cutout having faces 4031, 4032, FIG. 56, the purpose of which will subsequently appear.

The key receiving cylinder 4010 is supported at the front end of the machine on a U-shaped bracket 8000, FIG. 7, which is mounted on the base 5011. The legs 8000a and 8000b, FIGS. 9 and 10, of the U extend upwardly and their upper ends they are drilled transversely to receive and support the key cylinder in a horizontal position, with the key slot 4020 facing the sensing finger 5050, FIG. 9. The key cylinder is yieldably supported in its bracket by a leaf spring 8001 fastened to a plate 8000a′ secured to the bracket, the spring pressing against the rear end of the cylinder. Behind the leaf spring is a microswitch B which triggers the clutch solenoid S–5 and operates the key clamp 4016 to initiate a cycle of operation, as will be further explained herein.

The key receiver or key cylinder must operate to close normally open microswitch B during the key cutting operation, so it is important to keep the key cylinder locked stationary in its support in close contact with the contact arm of the microswitch, and the shoulder of the clamp 4016 accomplishes this in the following manner. The leg 8000a of the U bracket, at its upper end, supports an angle member 8005, FIG. 9, one flange of which overhangs the key cylinder, FIG. 12a, said flange having a notched out portion 8005a which is slightly greater than the head portion 4016′ of the key clamp 4016. When a customer's key is locked in the cylinder, as will be further explained, the operating rod 4016″ for the clamp 4016 will be in its upper dotted line position as shown in FIG. 12a, at which time the shoulder 4016′ of the clamp engages the flange of the angle 8005 above the notch 8005a. The key cylinder is thus held locked during the key cutting operation between the legs 8000a and 8000b of the U bracket, the spring 8001, FIG. 11, pressing the cylinder against the flange of the angle 8005. Without locking the key cylinder in this fashion during the key sensing and cutting operation, the cylinder would be likely to reciprocate back and forth in the legs 8000a and 8000b of the bracket.

The plate or bracket 8003, which is fastened to said U support, extends over the key cylinder and carries a leaf spring 8004, FIG. 9, which presses against the back of the clamp shoulder 4016′, insuring the opening of the clamp and its return to its starting position after the customer's key has been withdrawn from the key cylinder. This pushes the shoulder of the clamp downwardly so that it slips back into the notch 8005a under the pressure of the spring 8001, returning the cylinder to its starting position.

In FIGS. 8, 10, 11, a plate 8000a′ is mounted on the rear side of said leg 8000b, the plate supporting a leaf spring 8001 which is in engagement with the rear end of the key cylinder. This plate closes the lower portion of the hole 8000b, FIG. 10 for the rear end of the key cylinder. The upper portion of the key cylinder protrudes through said hole and the spring 8001 bears against the end thereof. The upper edge of the plate 8000a′ forms a rest and guiding surface of the face 4032 and the plate froms a stop for the face 4031 of the key cylinder.

BASIC CUTTING UNIT

The basic cutting unit comprises a base member, FIG. 5, 5011 having bearing supports 5012, 5013, respectively at each end. A shaft 5014 is supported in bearings at the upper end of these supports, each end of said shaft extending outwardly of said supports, one end carrying a milling cutter 5015, the other end supporting a pulley 5016 which is driven from a suitable motor 5017 by means of a belt 5018, FIG. 4. A portion of said shaft 5014, FIG. 5, adjacent the support 5012 is provided with a worm thread 5019 which meshes with a worm gear 5020. This worm gear is fixed on a short vertically disposed stub shaft 5021, FIG. 38, encased in a housing 5022. A portion of this housing is recessed at 5022a and the exposed portion of the stub shaft 5021 is provided with a worm thread which engages with a worm gear 5023 suitably supported on a shaft 5024 likewise supported in bearing support members 5012, 5013, below the shaft 5014. This worm gear 5023 has an integral part thereof a toothed clutch member 5025 which mates with a complementary toothed member 5026 supported in cooperative relation therewith on the same shaft 5024. The clutch portion 5025 idles freely on shaft 5024 until it is engaged by the mating portion 5026. The mating portion 5026 is keyed to the shaft at 5027 so as to rotate therewith, but is free to slide longitudinally of the shaft so as to be brought into mating engagement with the other portion 5025. A cam cylinder 5028, FIGS. 5, 38, having a spiral type cam groove 5029, is also mounted on the shaft 5024 and is keyed thereto by a set screw (not shown). Adjacent the clutch portion 5026 the cylinder has a counterbore or socket 5026a in its end portion, substantially of a diameter coincident with that of the external diameter of said clutch portion 5026, the counterbore receiving the said clutch portion when the mating clutch portions are disengaged.

Figures 39, 41:
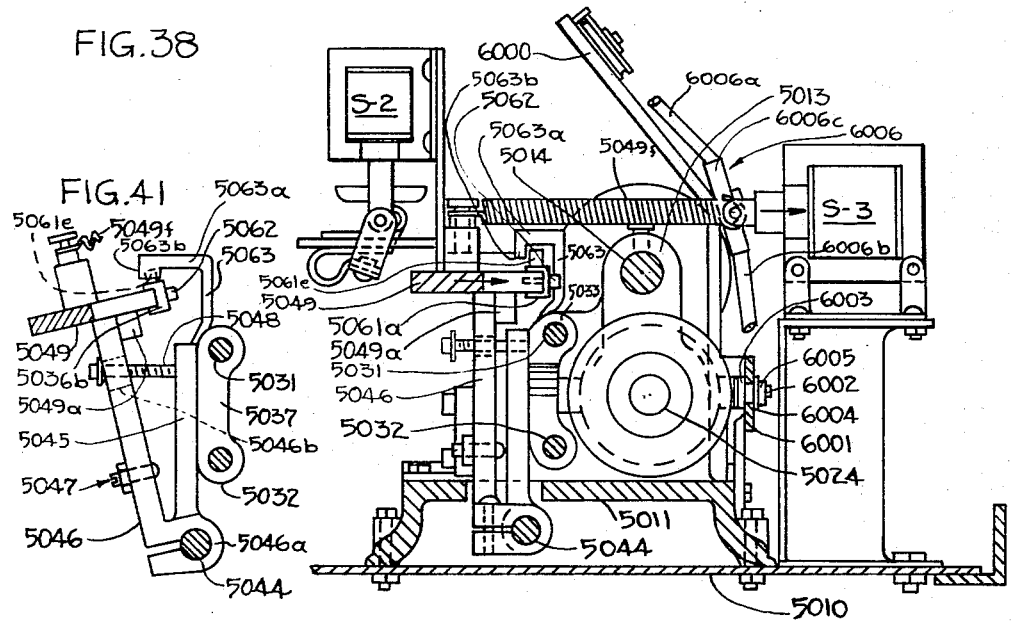
FIG. 39 is a cross section, with parts in elevation, taken along the line 39—39 of FIG. 38.
FIG. 41 is an elevational detail of the support bracket for the tracer bar in its non-sensing and non-cutting position, the position being exaggerated for purposes of illustration.
Figure 40:
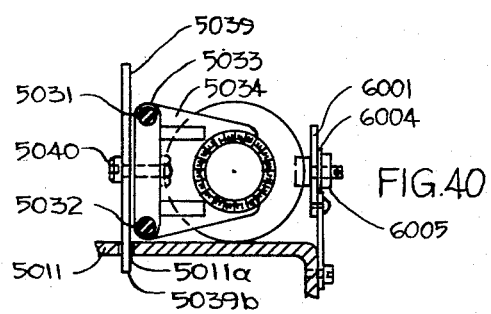
FIG. 40 is a cross section taken along the line 40—40 of FIG. 38.
Figure 46:
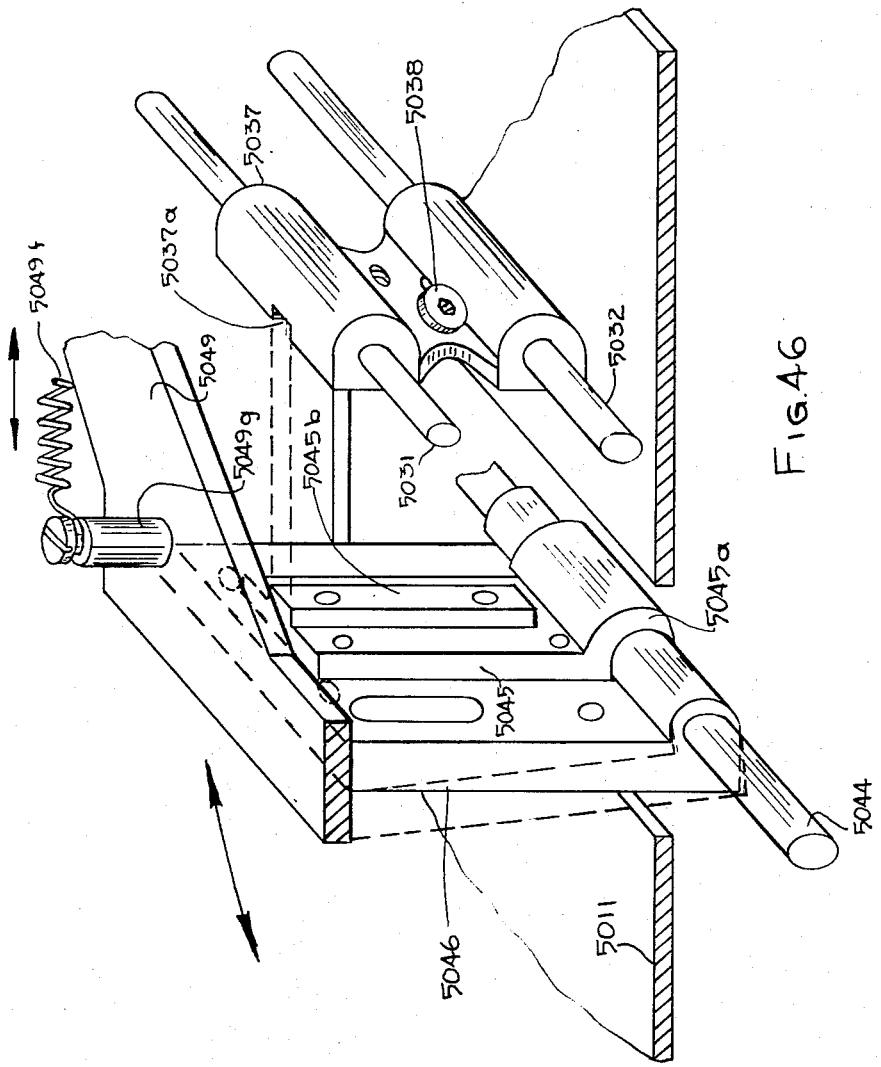
FIG. 46 is an exploded, perspective view of a portion of the tracer bar and its supporting and guiding elements.

At one side of the cam cylinder 5028, a pair of upper and lower rods, 5031, 5032, FIGS. 39, 40, 46, also supported in the bearing support members 5012, 5013, carry a slidable crosshead member 5033 having a yoke 5034, FIG. 40, which engages in the peripheral groove 5026b, FIG.

38, formed in the body 5026 of said slidable clutch member. Each rod 5031, 5032, FIG. 62, carries a coil compression spring 5035 which normally biases the crosshead 5033 to the right (FIGS. 5 and 38) and urges the clutch members toward a position of disengagement. The end face 5028a of the cam cylinder 5028, FIGS. 18, 62, has a recess 5028b to receive a roller member 5036 carried by the crosshead 5033. When the cam is in operation, the roller 5036 bears against the end face 5028a of the cylinder under pressure of the spring 5035, at which time the clutch members are engaged. At that point in the rotation of said cam cylinder, when the recess becomes opposite the said roller, the spring 5035 force the crosshead 5033 to the left in FIG. 62 so that the roller enters the recess and a yoke 5034 acts on the slidable clutch member to disengage the clutch, forcing the slidable member thereof to the right in FIG. 38 into the socket 5026a in the cylindrical cam chamber 5028.

Also mounted to slide on the rods 5031, 5032, is a second crosshead 5037, FIGS. 46, 62, which carries a roller 5038 on that side facing the cylinder cam, said roller 5038 projecting into the cam groove, the cam slot being so arranged as to carry the crosshead back and forth on the said rods during rotation of the cam.

The crosshead 5033 supports a plate 5039, FIG. 18, which is pivotally mounted thereon by a screw 5040, the plate having an arm 5039a extending outwardly of the machine for engagement with a solenoid linkage as will later be described. The plate has a downwardly extending lug 5039b, which projects into an accommodating hole 5011a in the base 5011, serving as a fulcrum for said lug when the plate pivots about the screw, as will be described.

Downward pressure on the arm 5039a will cause the plate to swing on its pivot and with the lug engaged in the hole 5011a, the plate and its connected crosshead will ride slightly to the right, FIG. 18, withdrawing roller 5036 from the end recess of the cylinder cam, disengaging the clutch members.

Figure 42:
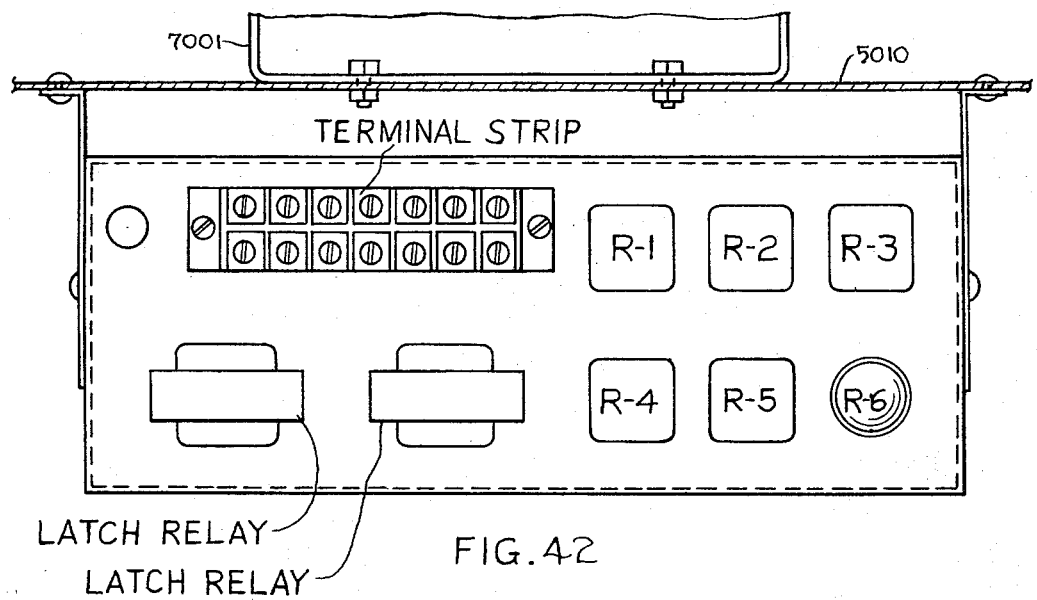
FIG. 42 is an elevational view of the electrical relay mounting panel taken along the line 42—42 of FIG. 14.

The base 5011, at its ends, supports a rod 5044, FIGS. 39, 41 and 46, below the mechanism described, and a sliding member 5045 having a bearing portion 5045a is mounted to slide on said rod. The slide member 5045, FIG. 46, has a projecting rib 5045b which engages a corresponding groove 5037a cut into the face of the crosshead 5037 and the slide member is fastened to the crosshead by screws. A second and outer slide member 5046, FIG. 41, has a pair of offset ears 5046a, FIGS. 46, 42, said ears forming bearings which also slide on the rod 5044, said ears straddling the bearing portion 5045a of the slide 5045. The slide 5046 is arranged to swing inwardly and outwardly with respect to the slide 5045 and carries a lower limiting or stop screw 5047 which limits movement towards the member 5045. Another upper stop screw 5048 passes through an enlarged hole 5046b in the slide 5046 and is fastened in the slide 5045. The screw 5048 is a long screw to allow the member 5046 to swing back and forth, the head of the screw serving to limit outward movement.

TRACER BAR, SENSING MEANS AND BLANK KEY FEEDING MECHANISM

Figure 52:
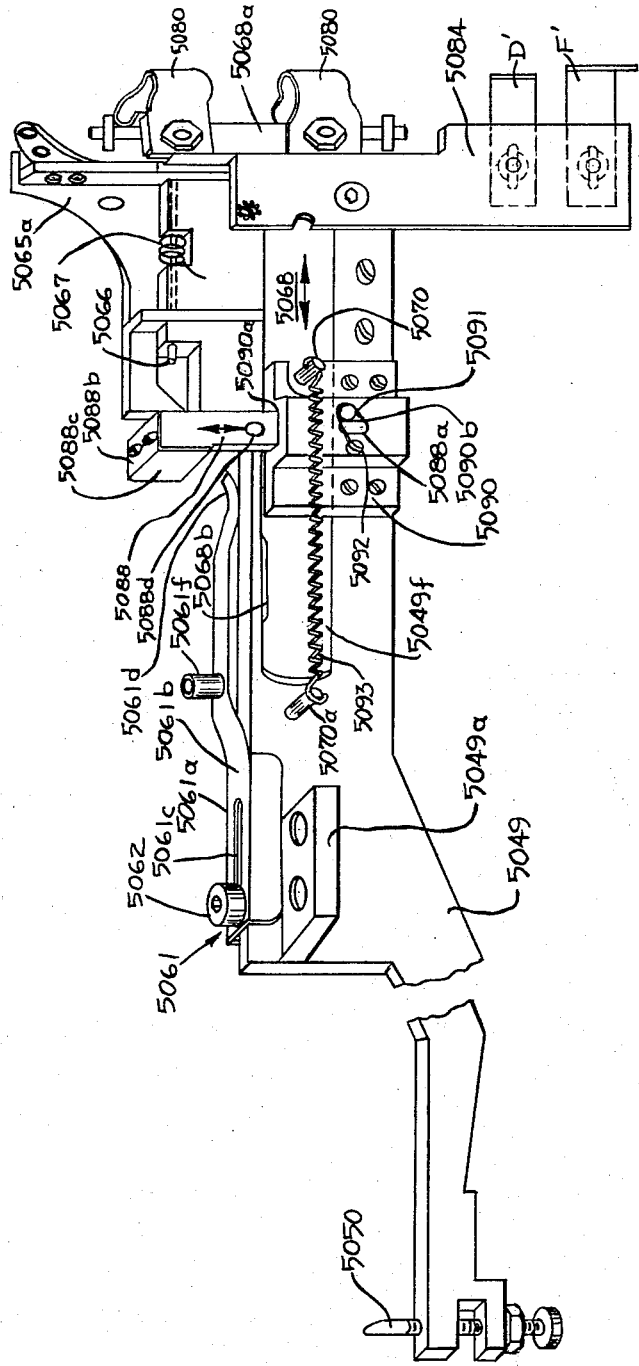
FIG. 52 is a similar view of the tracer bar, looking at the lower or bottom face thereof.

A tracer arm 5049 (FIGS. 33–36, inclusive, and 51, 52) has a downwardly extending lug 5049a, FIGS. 39, 52, by means of which said tracer arm is secured to the slide member 5046. The tracer arm carries a pattern tracing or sensing finger 5050 at one end and a key blank or workpiece receiving and clamping means at the other end. The upper surface of the tracer bar is milled out, FIG. 51, for a portion of its length at 5049b at said clamping end to reduce its thickness, so that when the blank workpiece, or duplicate key, is supported on said bar at said end, it will lie in the same plane as that of the longitudinal axis of the sensing finger. A plate 5051 with a pattern guiding edge surface 5051a having a thickness slightly greater than the thickness of the blank workpiece is seated over said milled out portion and forms a guide for one side of the blank workpiece. A block 5052 is seated over the said plate to support a clamping member 5053. The block 5052 is milled out to provide a recess 5052a within in which the clamp is seated. The clamp is pivoted to said block on a pin 5054. The clamp has a block portion 5053a on its upper surface from which a clamp operating rod 5053b projects outwardly. It will be noted that the clamp 5053 overhangs the edge of the lower plate 5051 so that there is a space between the upper surface of the tracer bar and the lower face of the clamp to receive and clamp a workpiece, as will be described. The clamp is similar to the clamp shown and described in connected with FIG. 17 and elsewhere.

A supporting bracket 5055, FIG. 17, is also mounted over the tracer bar, extending upwardly therefrom, and it has an opening 5055a through which said operating rod 5053b projects. A solenoid S–2 is mounted on said bracket with its armature S–2' extending towards said operating rod 5053b of the clamp. A yoke member 5057, FIG. 17, is pivotally supported from the free end of the armature by means of a pin 5058 passing therethrough. A leaf spring 5059 is looped over said pin and has an arm bent outwardly exerting a downward pressure on said clamp operating rod. Another leaf spring 5060 is fixed to the crosspiece 5157a of the yoke below said rod and is looped upwardly to engage the lower side of said rod to urge said rod upwardly. The rod is therefore yieldably supported from above and below and is operatively connected to the armature S–2' so that when the solenoid S–2 is energized, it will operate to clamp the workpiece and release it when deenergized.

A spring slide member 5061, FIGS. 33–37, inclusive, and 51, 52, is mounted to slide on the edge of the tracer bar adjacent the key clamp. This member 5061 comprises a channel-shaped portion 5061a which straddles the edge of the tracer bar so as to be capable of reciprocating motion thereon. The base 5061b of the channel is slotted for the greater portion of its length at 5061c to accommodate a screw 5062 which secures the channel member to the tracer bar. The forward portion 5061d of the base is formed as a leaf spring to extend outwardly slightly spaced from the bar and extending forwardly, so as to apply a pressure force against the edge of the tracer bar in front of and adjacent the clamp 5053 until a workpiece such as a duplicate key blank is inserted, with its back edge against the surface 5051a, FIG. 51, in which event the spring engages said key blank and presses said key blank against said surface 5051a. A stud member 5061e is fixed to the upper leg of the channel 5061a and another stud member 5061f is fixed to the leaf spring portion, rearwardly of the upper stud member. An inverted L-shaped bracket member 5063, FIGS. 39, 41, fixed to the bearing support 5013, extends upwardly adjacent the crosshead 5037, and the short leg 5063a of said bracket extends therefrom over said crosshead. The short leg of the L has a short downwardly projecting lug 5063b.

Figures 33, 34, 35, 36:
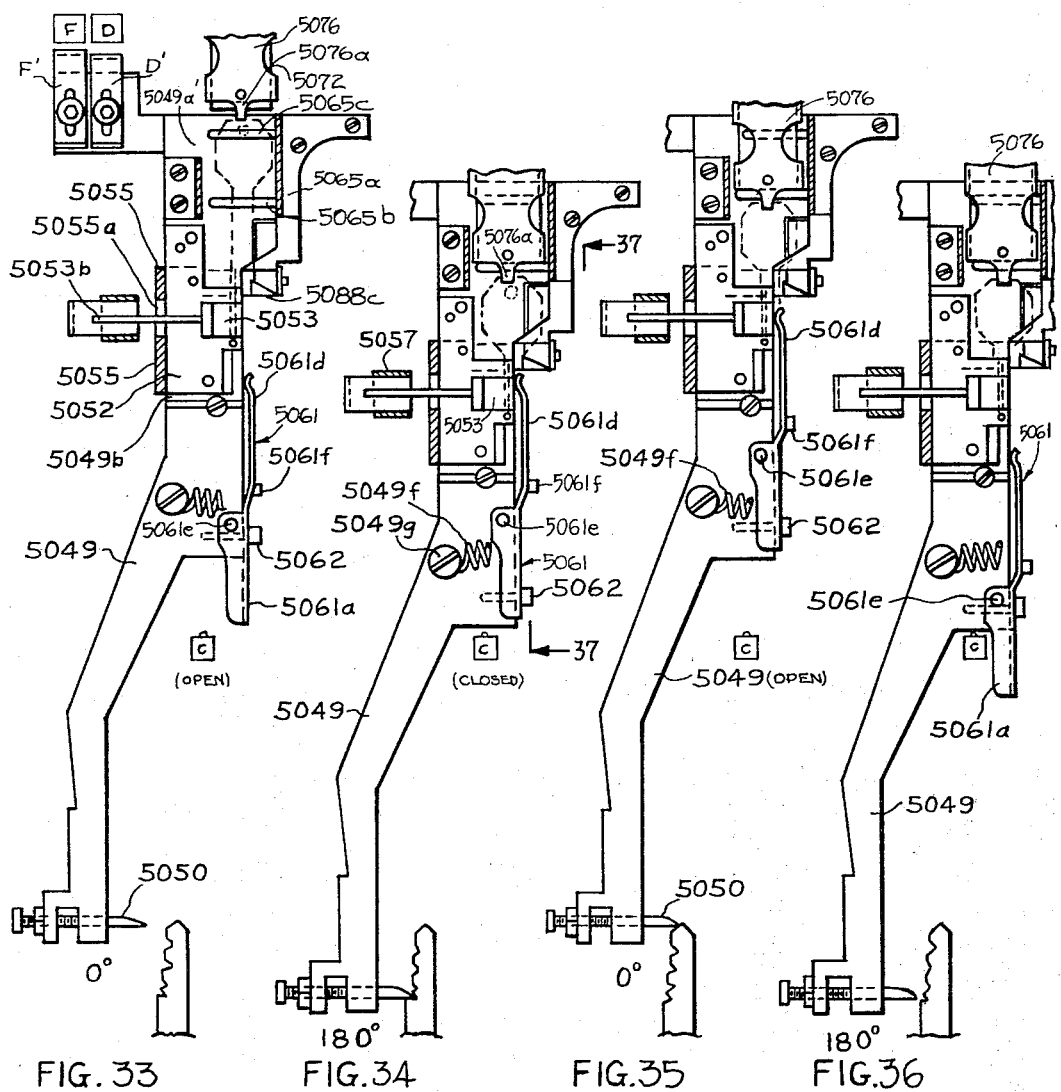
FIG. 33 is a detail in plan view of the tracer bar with sensing finger in the 0° position, showing the relationship with the blank and the pattern, or customer's key, as the pattern is about to move to cutting position.
FIG. 34 is a similar view showing the tracer bar in the 180°, or forward position, about to start sensing the customer's, or pattern key, and about to start cutting the blank or duplicate key.
FIG. 35 is a view similar to FIG. 33, showing the relationship of the parts after a first cutting operation, the tracer bar having returned to its 0° position.
FIG. 36 is a similar view showing the relationship of the parts after a second, or return cutting operation, the tracer bar having returned to the 180° position.
Figure 37:
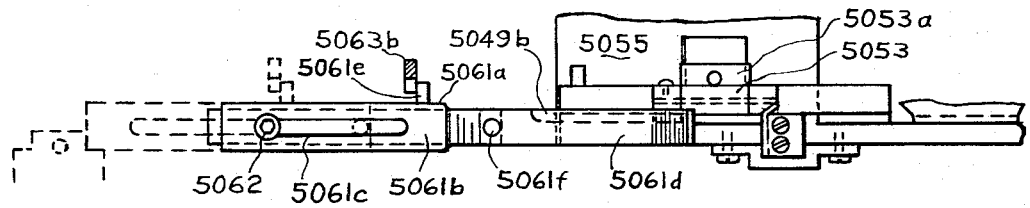
FIG. 37 is an end elevation taken along the line 37—37 of FIG. 34, with parts shown in dotted line position.

With the tracer bar 5049 in the starting position shown in FIG. 41, with a duplicate key blank delivered to the key table 5049a', and with the channel slide member 5061 and leaf spring 5061d in the position shown in FIG. 33, forward movement of the tracer bar from the 0° position indicated to the 180° position of FIG. 34 will cause the overhanging lug 5063b to be engaged by the stud 5061e, whereupon the latter and the channel shaped slide to which it is attached, will be pushed to the position shown in FIG. 34, so that the leaf spring 5061d is brought to bear against the edge of the key blank which has now been pushed into the jaws of the clamp 5053.

As the tracer bar is pulled to the right (from FIG. 41 to FIG. 39) into sensing and cutting position by solenoid S–3 and spring 5049f, as will be explained, and moves in a stroke to the 0° position, FIG. 35, the stud 5061e is moved out of the path of the lug 5063b, and the stud 5061f is moved into the path of the bracket 5063, whereupon the channel slide and spring are moved to the position shown in FIG. 36, removing the leaf spring from the path of the cutter. The leaf spring always moves in relation to the cutter. When the cutter engages the blank key for the cutting operation, the spring always moves out of is path at the same speed as the workpiece or key moves past the cutter.

The upper surface of the tracer bar at its rearward portion has a table 5049a', FIG. 51, with a funnel-like shoulder formed by the edge 5051a of the plate 5051 along which the workpiece is received prior to being fed into the clamp 5053. The shoulder forms one half of a trough about to be described. A guard wall 5064, FIGS. 5 and 28, is erected along one edge of said shoulder and a similar, second guard wall 5064b is erected opposite said first one to insure that the workpiece or key blank is not displaced therefrom when discharged against said shoulder, as will more clearly appear further herein.

The tracer bar table 5049a' is provided with parallel spaced slots 5049b and 5049c, FIG. 51, to accommodate the arms of a key discharge device 5065. Adjacent said slots, the tracer bar table has a lateral extension forming ears 5049d and 5049e to receive a pin 5066. Said discharge device 5065 is pivotally supported on said pin and comprises a table-like portion 5065a having a pair of arms 5065b and 5065c extending, respectively, into said slots 5049b and 5049c, the pivot pin 5066 passing through said arms so that said discharge device may pivot thereon. A hinge spring 5067 about the pivot pin biases the table 5065a and its arms 5065b and 5065c, normally into a horizontal position with respect to the surface of the tracer bar table, the arms being seated into their respective slots. The inward edge 5065a' of the table forms, with the edge 5051a, the other half of the wall of said funnel-like trough heretofore mentioned.

On its bottom surface at the rear end thereof, FIG. 52, the tracer bar is provided with an elongated longitudinally extending groove 5049f. A crosshead slide member, FIG. 51, having an elongated arm 5068, is arranged to slide in said groove, the slide having the crosshead 5068a. A pin 5070, FIG. 52, projects downwardly from said arm 5068. A pusher plate 5072, FIGS. 29–31, is supported on the crosshead over a spacer bar 5074 which is equal in thickness to that of the rearward end of the tracer bar at said funnel-like trough, the plate 5072 extending forwardly of said arm 5068 for a portion of its length and terminating just short of the rear end of the tracer bar. The forward edge of said plate adjacent the end of the tracer bar is rounded off to provide a sloping surface and said surface is provided with a downwardly biased V-groove (not shown) cut into the central portion of its forward edge. A plate 5076 of spring steel is supported on said pusher member, said plate having a forwardly and downwardly extending finger 5076a at its forward end, and a pair of ears 5076c at its rearward end, a pin 5077 passing through said ears. Said finger 5076a is mounted so as to ride upwardly in said V-groove when said spring plate is retracted, as will be more fully described. A retainer strip 5078 is mounted over the plate 5076, said retainer strip serving to guide the spring plate in its reciprocal movements. The spring plate 5076 is normally urged forward by a pair of leaf springs 5080. These springs, the cross head 5068a, the spacer bar 5074, the pusher member 5072, the spring plate 5076, and the retainer strip 5078 are all secured together by a pair of screws 5082.

A bracket 5084, FIG. 52, is suitably fastened to the underside of the tracer bar at its rearward portion, the bracket extending transversely of the tracer bar, as shown in FIGS. 51, 52. A pair of pusher or contact fingers F′, D′ are adjustably mounted on said bracket, said fingers extending rearwardly of the bracket.

A spring loaded transverse slide member 5088, FIGS. 26, 52, is mounted to slide transversely of the underside of the tracer bar adjacent the forward position of the leaf spring 5061d. This slide member is supported on the underside of said tracer bar by a channelled plate 5090, the slide moving in the channel 5090a. The base of the channel portion is slotted at 5090b to receive the one arm of a spring 5091 secured to the underside of the channel, this arm extending upwardly through the slot into a hole 5088a in the slide member 5088, the other arm of the spring being anchored on said channel and held in position by a screw 5092. The slide member 5088 has an upwardly extending block 5088b to one side of which an angle 5088c is secured, the referenced face of this angle projecting forwardly and upwardly a short distance beyond the edge of said block in the direction of the tracer bar, FIGS. 25, 26, 51a, 52. It is important that the thickness of said plate 5088c be substantially the same as the thickness of the disc 4021 in the key receiver mechanism, since said plate engages a reference point on the workpiece or blank key (the shoulder, FIG. 59) and the disc engages a similar reference point on the work pattern or customer's key. The distance between said reference points must be equal to the distance between the point of the sensing finger or stylus 5050 and the cutting edge of the cutter 5015 when the sensing finger is at the shoulder of the key. It will be understood, therefore, that when a blank workpiece is fixed in the clamp 5053 in position for cutting, its reference point (the shoulder) will engage said plate 5088c, FIGS. 51, 52.

The elongated arm 5068 of the longitudinal crosshead slide member has a cam notch 5068b (FIG. 52) formed in one edge. The transverse slide member 5088 has a pin 5088d on its upper surface riding through a notch 5049g, FIG. 52, in the under surface of the tracer bar, said notch communicating with said elongated groove 5049f, so that when said elongated arm 5068 is reciprocated in its slot or as the cam notch 5068b passes said pin 5088d, the slide 5088 is reciprocated transversely in its channel. Thus, when the longitudinal slide member 5068 is withdrawn rearwardly of the tracer bar, as the pin 5088d drops into the cam notch 5068b, the transverse slide 5088 moves inwardly of the tracer bar, and vice versa, but the slide 5068 moves for a substantial portion of its stroke before the transverse slide 5088 is actuated. The purpose of this is to give plenty of clearance to the blank key to enter the key slot and to prevent engagement of the key shoulder by plate 5088c until the key is fully seated under the clamp 5053. Then plate 5088c moves in and engages the shoulder on the key.

The elongated slide 5068 has a downwardly projecting pin 5070, FIG. 52, secured to its undersurface, and this pin is connected by a coil spring 5093 to a similar pin 5070a anchored forwardly thereof on the underside of the tracer bar. The slide is retained in its slot at its forward end by the channel plate 5090 and at its rear by the plate 5084. It will be clear from the foregoing that the forward movements of the slide member 5068 are controlled by the spring 5093. The slide member 5068 serves as a limiting stop for the key ejecting arms 5065b and 5065c.

Figure 38:
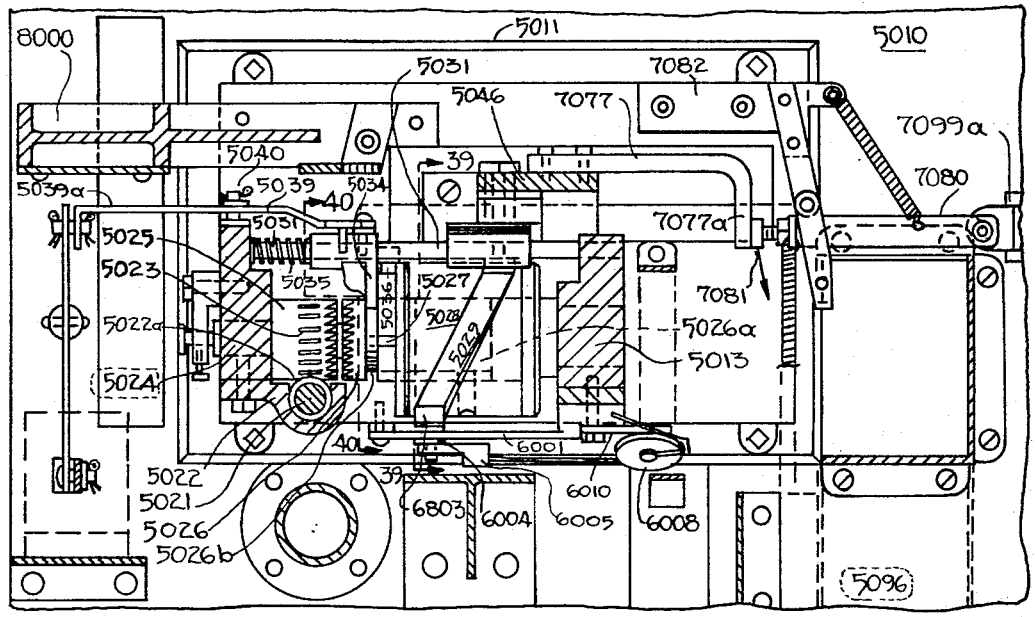
FIG. 38 is a plan view, with parts in section, showing the clutch and driving mechanism for the tracer bar.

On the right side of the machine as shown in FIGS. 14, 39, a bracket 6000 is fixedly mounted in a vertical position on the bearing support 5013. A plate 6001 is fastened at one end to said bracket, the other end having a downwardly extending leg 6001a which is fastened to the base 5011. The plate 6001 has a central longitudinal slot 6001b cut through it and a pin 6002 is fastened in said slot and extends through it, FIG. 39. A cam follower roller 6003 is rotatably mounted on one end of said pin and engages in the cam slot 5029, FIGS. 14, 38, 39, 40. The other end of the pin carries a sliding washer 6004 over which a clamping plate 6005 is mounted. A crank 6006, having diverging arms 6006a and 6006b, connected to a central hub 6006c, is provided to the bracket 6000. An idler pulley 6008, FIG. 14, is supported on the bracket 6010 which is fixedly mounted on the plate 6001, to the right of the hub 6006c as seen in FIG. 38. The lower crank arm 6006b is connected by a cable 6012, passing over idler pulley 6008, to the clamping member 6005. The upper crank arm 6006a is connected by a cable 6014 to the blank key withdrawal slide supported by the blank key storage turret, which will hereinafter be described.

BLANK KEY STORAGE

Figure 13:
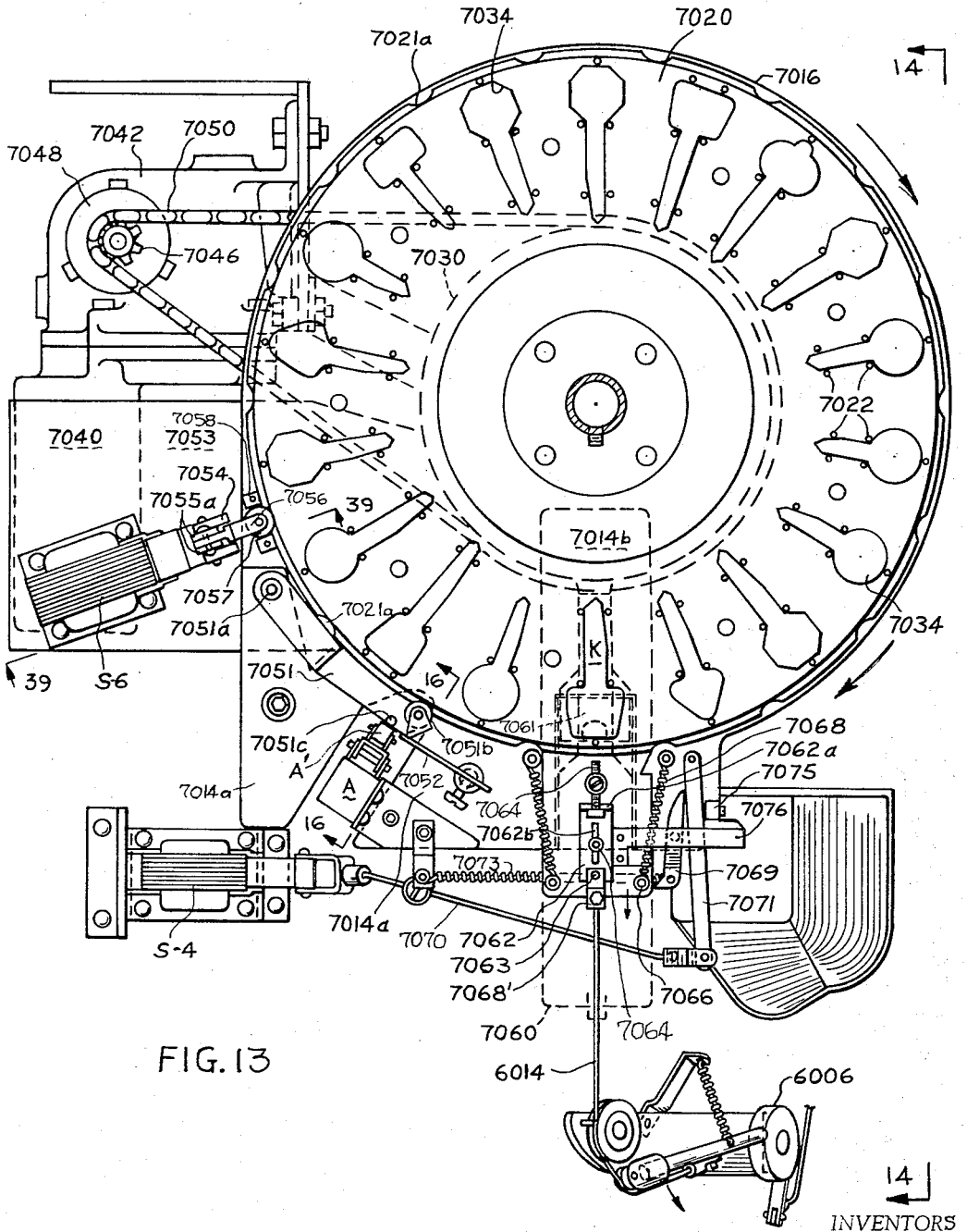
FIG. 13 is a plan view of the key blank storage turret, turret lock, and the key blank slide withdrawal mechanism, taken along the line 13—13 of FIG. 4.

The turret, FIGS. 4, 13, 14, 45, 47, for key blank storage comprises a flanged base member 7000 bolted to a table 7001 which in turn is bolted to base plate 5010. A vertically arranged rod 7002 is pinned to said flanged base. A thrust bearing 7004 is seated around said rod in a counterbore 7006 in the flanged base and a flanged support member 7008 is seated around said rod over said thrust bearing. A sprocket wheel 7010 is fixed to the hub of said support member 7008, and three posts 7012, only two of which are shown, support a circular plate 7014 around the flange of the support member 7008. The rotating turret itself, generally designated by the numeral 7016, comprises a cage having upper and lower circular plates, 7018, 7020, tied together by a series of vertical rods 7022 which are symmetrically arranged between said plates, in patterns to accommodate the contours of the keys which are intended to be stored therein, particularly as shown in FIG. 13. A disc plate 7021 of greater thickness than the plates 7014 and 7020 lies between said two plates. A length of tubing 7024 having a flange 7024a at its upper end and a flange 7024b at its lower end is seated over the rod 7002 and is appropriately bushed to the rod at 7026 and 7028, the bushings being press fitted to the tube. The lower flange 7024b is bolted to the plate 7020 and 7021 as shown. The upper flange 7024a supports a sprocket wheel 7030, which is suitably fastened thereto. The rod 7002 is supported at its upper end against lateral sway by a heavy bracket arm 7032, FIG. 47, the other end of which is fastened as will be hereinafter described. A nut 7034 locks said bracket to the rod or post 7002.

The plates 7020 and 7021 are cut out at 7034 in the actual of the key blanks which are to be stored therein, as shown in the plan view of FIG. 13, and the blank keys are stored and stacked in these openings between the rods 7022, a portion of a stack being shown in FIG. 4. The keys may be stacked up to the height of the upper plate 7018, FIGS. 4, 45.

The blank key turret is driven in the following manner. A motor 7040, FIG. 4, through a reduction gear drive 7042 and reduction gear output shaft 7044, FIG. 13, drives a sprocket member 7046, the sprocket being fixed to a clutch member 7048, which permits slippage between the reduction gear output shaft and the sprocket to allow for the short period of rotation of the motor after the turret has been locked against rotation in a manner to be explained. With the turret unlocked, the output shaft of the reduction gear and the sprocket will be coupled by the clutch and driven by the motor, the sprocket 7046 being connected to the turret sprocket 7030 by an endless chain belt 7050.

The sprocket is locked against rotation for delivery of a key to the withdrawal slide in the following manner. The plate 7014, FIG. 13, under the key storage turret has a lateral extension or table 7014a, FIG. 49. An indexing arm 7051, FIG. 13, is pivoted to the plate extension 7014a at 7051a. The free end of this arm carries an indexing roller 7051b which is constantly yieldably urged by leaf spring 7052 into engagement with indexing notches 7021a formed in the periphery of the disc plate 7021 of the turret.

A supporting plate 7053 is mounted upon the turret base 7000, FIG. 15. A vertical bracket 7054 is fixed to this plate and extends upwardly therefrom into close proximity to the lower portion of the turret. Laterally disposed with respect to said bracket, a solenoid S-6 is fixed to said plate 7053, and the armature S-6a of the solenoid extends towards the bracket 7054 and its end is linked to the vertically extending arm 7055, the upper end of said arm being pivoted to the bracket 7054 at 7054a. The portion of said arm above the pivot is bifurcated in a vertical plane at 7055a, FIG. 13, to pivotally receive and support a short indexing lever 7056 which is bifurcated in a horizontal plane at its free end at 7056a, FIG. 15, to rotatably receive and support an indexing roller 7057, said indexing roller projecting into one of said indexing notches 7021a of the turret. A thrust absorbing yoke member 7058, FIG. 48, is riveted to the plate extension 7014a closely adjacent the periphery of the indexing disc plate 7021 and over the support bracket 7054, with the roller 7054 received between the arms of the yoke.

The purpose of this yoke is to absorb the force exerted on said roller when the turret is locked by the indexing roller as said roller is urged into locking engagement with an indexing notch or indentation of the indexing plate when a key blank has been selected for cutting, as will be explained. The turret is very heavy when loaded with key blanks and a locking device is needed to lock said roller into said notch. Otherwise the momentum of said turret might carry the notch past said indexing roller.

The arm 7051, FIG. 13, has a short stud 7051c extending vertically therefrom adjacent the roller 7051b. A microswitch MS–A is mounted on the table 7014a adjacent this post, with its roller contact member A' in contact with said stud. The roller 7057 of the turret locking mechanism is normally retained out of engagement with an indexing notch. The roller 7051b of the arm 7051 is normally in engagement with an indexing notch of the turret, being spring pressed therein by the leaf spring 7052. When the machine is in operation and the turret is rotating and the roller 7051b enters the first notch presented to it by the rotating turret, as soon as the power to drive the turret has been shut off, the microswitch A sends a signal to the solenoid S–6 to energize it and swing the lever 7055, FIG. 15, about its pivot 7054a to lock the roller 7057 in the adjacent indexing notch, thereby locking the turret.

Figure 61:
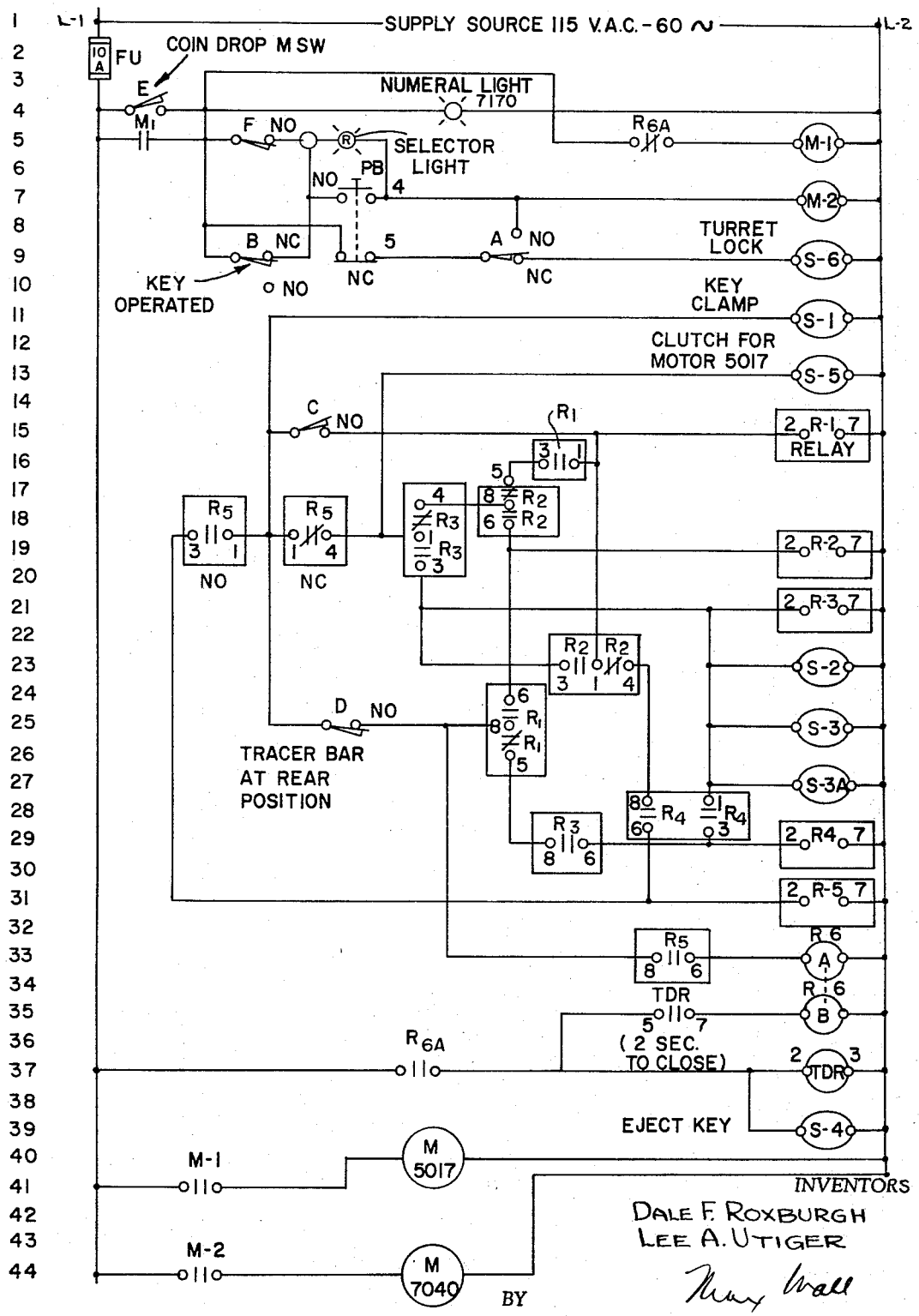
FIG. 61 is a diagrammatic view of the electrical circuits for the machine.

The turret is controlled from the push button PB, see FIGS. 1, 2, and the electrical circuit, FIG. 61. Should the push button be released before an indexing position is reached, that is, if the push button PB is released while the turret is rotating with the locking mechanism between indexing points, microswitch MS–A re-routes the circuit to deenergize solenoid S–6 and keep the turret motor 7040 energized until the turret reaches an index position, at which time motor 7040 is deenergized. Thereupon microswitch MS–A drops out of the circuit.

KEY SLIDE WITHDRAWAL MECHANISM

Figure 21:
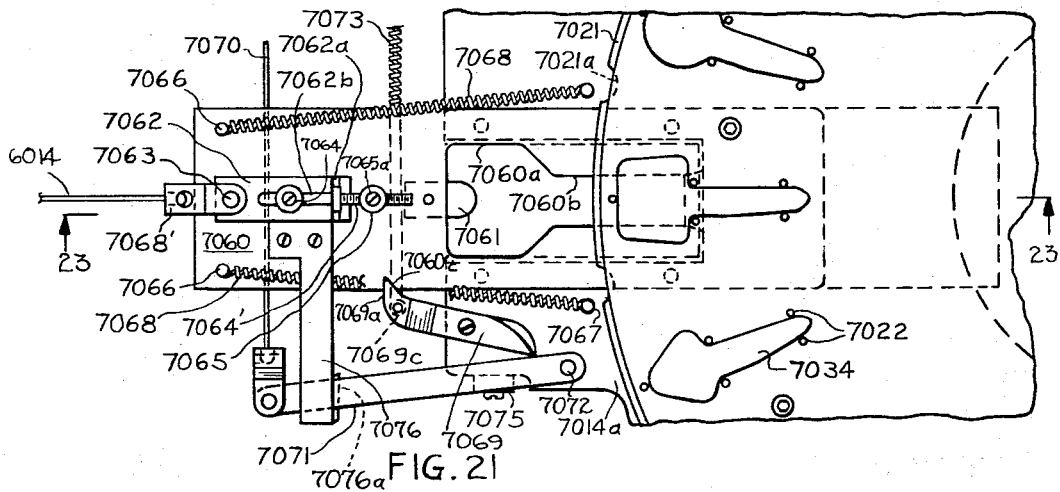
FIG. 21 is a detail in plan view showing the key withdrawal slide and its relationship to the key storage turret.
Figure 23:
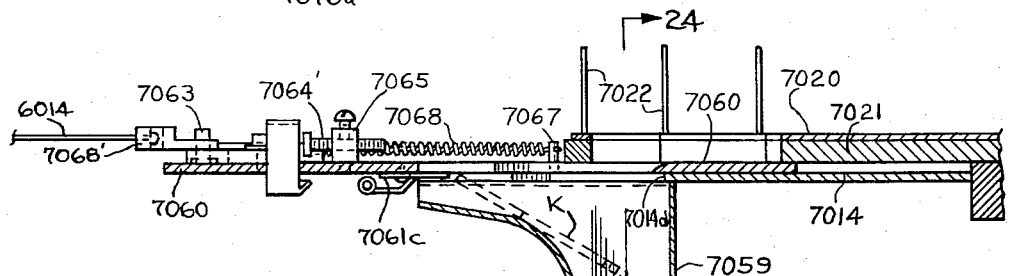
FIG. 23 is a central, longitudinal, sectional view taken along the line 23—23 of FIG. 21.
Figure 24:
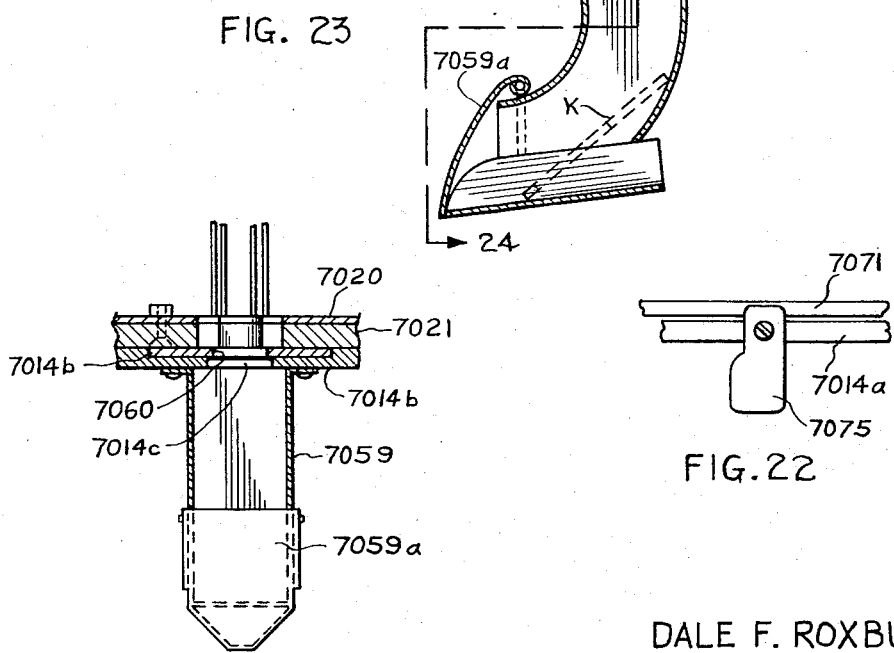
FIG. 24 is a vertical sectional view taken along the line 24—24 of FIG. 23.

The extension plate 7014a, FIG. 50, is milled out for a portion of its thickness to provide a recessed slideway 7014b, the central portion being cut away to provide an opening 7014c, as a key drop, the recess extending into the plate portion 7014 under the plate 7021, as best seen in FIG. 50. A chute 7059, FIG. 23, is fixed to the underside of plate 7014 to receive and guide selected key blanks from the turret to the cutting table, the chute having a hinged flap 7059a at its discharge end to decelerate the speed of the key discharge from said chute. A key withdrawal slide plate 7060, FIGS. 21, 23, 49, is mounted to slide in said recess 7014b, said slide plate having a central cutout portion generally resembling the contours of a key blank. The head portion of a key blank is adapted to be received in the head portion 7060a and the stem or shank of the blank key is received in the shank portion 7060b of the cutout. A key head supporting tab 7061c is riveted to the underside of the slide plate and a portion of said tab extends into the head cutout portion 7060a to support the head of a key as it is withdrawn from the turret until the end of the key shank passes over the edge 7014d of the plate 7014a, as best shown in FIG. 23.

At its forward end the slide plate, FIGS. 21, 49, is provided with an adjustment mechanism to adjust the throw of the plate 7060 in its slideway. This mechanism comprises a short plate 7062 having an elongated slot 7062b, the plate also having a vertical stud 7063 at one end spaced from the slot. A locking screw 7064 passes through the slot of the plate and into the slide plate beneath it to lock the plate 7062 in adjusted position. Said plate 7062 further has a transverse slot 7062a, FIG. 49, milled into its surface at its rearward end, the forward wall of the slot being engaged by the head of a threaded screw 7064' which is threaded for adjustment into the body of a vertical stud 7065. The screw is locked in the stud by means of a locking screw 7065a.

A vertical stud 7066 is mounted on the slide plate 7060 on each side of the adjusting plate 7062 and corresponding studs 7067 are mounted rearwardly thereof on the plate extension 7014a. These studs are connected by tension springs 7068, one spring on each side of the slide plate, as best shown in FIGS. 21, 23, 49. These springs tend to pull the slide plate into the slot 7014b, FIG. 50.

The stud pin 7063, FIGS. 21, 49, is engaged by a coupling device 7068', adjustably secured to the end of the cable 6014, the function of which is to withdraw the key slide plate 7060 from its position under the key turret to bring its cutout portions 7060a and 7060b over the discharge chute, the cable pulling against the tension of springs 7068. When the slide 7060 is withdrawn to the limit of its outward movement (which is controlled by the cam groove 5029, as best shown in FIG. 14), it is locked in this position by a spring controlled double end pivoted pawl 7069, FIG. 21, one end of which enters a notch 7060c in the edge of plate 7060, and this locked position is maintained until the machine is caused to deliver another blank key from the turret, at which time a solenoid S-4 is energized to pull on cable 7070, FIG. 13. This cable, FIG. 21, is attached to a pawl release arm 7071 pivoted at 7072, behind the free end of said pawl, to the table 7014a. The pawl is controlled by a spring 7073, FIGS. 21, 49, hooked at one end to a short bracket 7074 fastened to the table 7014a. The other end of said spring is secured to the underside of the pawl at 7069.

Figure 22:
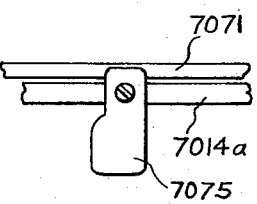
FIG. 22 is an enlarged detail of a portion of FIG. 45, showing an end elevation of the detent controlling operation of the key slide.

When the solenoid S-4 is energized, as will be explained, the arm 7071 is pulled by the cable 7070, FIG. 19, against the free end 7069b of the pawl, disconnecting it from the slide 7060, whereupon the slide moves slowly in the direction of the turret to pick up another blank key, actuated by the cam 5029. At this time, the parts will assume the position shown in FIG. 13. As the arm 7071 was pulled over against the pawl, a gavity operated detent 7065, FIGS. 21, 22, pivoted to an edge of the table 7014a, dropped behind the arm to prevent its return to its starting position, thus keeping the nose 7069a of the pawl out of the path of the slide 7060. This position of the parts is shown in FIG. 49. As the slide approaches the limit of its rearward movement, a restoring arm 7076, fastened to the slide, has a downwardly extending finger 7076a bent to lie in the path of and engage the detent 7075, swinging it about its pivot to remove the detent from the path of the arm 7071. The spring 7073, FIG. 13, thereupon pulls against the pawl 7069, swinging it about its pivot and forcing the nose 7069b against the arm 7071, causing it to swing over the detent 7075, holding it in inoperative position. As the slide is withdrawn from the turret to deliver another key, the finger 7076a, FIG. 49, pulls away from the detent, which is then retained in its inoperative position by the overhanging arm 7071, until the solenoid S-4 is again energized, at which time the cycle just described is repeated.

A bracket arm 7077, FIGS. 20, 60, having a right angled push pad 7077a, is attached to the plate 5046 which supports the tracer bar, and the bracket arm moves in unison with the tracer bar. Behind this push pad and secured to the base plate 5010 is an angle bracket 7078. A yoke member 7079 is pivoted to said bracket, this yoke having a leg portion 7079a and a bifurcated Y-shaped portion 7079b with slotted fingers extending upwardly, the slotted fingers engaging the rod 5077 of the key delivery mechanism attached to the tracer bar 5049. Midway of its length, the leg 7079a has a finger 7080, FIG. 60, pivotally attached thereto for swinging movement about a vertical and horizontal axis. At its free end this finger has an adjustable screw 7981 to maintain contact with the push pad 7077a. A further bracket 7082 is fixed to the machine base 5011 adjacent the bracket 7077, the bracket 7082 extending rearwardly of the base and having a finger to which a tension spring 7083' is attached, the other end of said spring being hooked to the finger 7080, FIGS. 20, 60, normally tending to pull the finger 7080 and the screw 7081 in the direction of the pad 7077a. The pull of this spring is greater than that of 7085, which will be described. The bracket 7082 also supports an arm 7083 which extends in the direction of and passes beneath the finger 7080, the arm being bent upwardly at 7083a and extended over upon itself to form an upper bar 7083b, spaced from the lower portion. The finger 7080 passes through this space and is limited in its swinging movements by two spaced pins 7084 which pass through the upper and lower portions of the arm. The spring 7083', as previously mentioned, normally pulls the finger in the direction of the pad 7077a, the finger being stopped just behind said pad by the adjacent pin 7084, when the tracer bar is in its full forward or 180° position. A solenoid S-3a, FIGS. 20, 60, is suitably mounted on the base plate 5010 in a position opposite the pad 7077a, and the armature of the solenoid is connected by a tension spring 7085 to the finger 7080 adjacent the screw 7081. Just prior to the return movement of the tracer bar to its 0° position, the solenoid S-3a is energized, whereupon the armature pulls on the spring 7085 to pull the adjusting screw out of the path of the pad to allow the tracer bar to move to the 0° position. Since the pull of the spring 7083' is greater than that of the spring 7085, the former overcomes the latter and pulls the finger 7080 and its cap screw 7081 into the path of said pad 7077a.

The function and operation of these several mechanisms will be more clearly understood when the operation of the machine as a whole is explained.

Key blanks are selected by the customer by number, the key number for various makes and year models of automobile being noted on a chart on the front of the machine substantially as follows:

AMERICAN AUTO KEYS

| Type of Automobile | Switch, Trunk | Year of Auto | Key No. |
|---|---|---|---|
| Buick | Switch Trunk | All years | 1 |
| Cadillac | Switch Trunk | All years | 1 6 |
| Chrysler | Switch Trunk | 1952–56 1952–56 | 9 16 |
| Chevrolet, Corvair, Corvette | Switch Trunk | All years | 1 |
| Packard | Switch Trunk | All years | 15 8 |

The key numbers in the last column appear on a dial 7164, FIG. 4, on the machine which is selectively rotated by the customer until the number selected appears in the window 5, FIG. 1, of the machine housing. When the selected number appears in said window, the proper key blank in the turret storage unit will be presented to the key withdrawal mechanism for delivery to the cutting mechanism for cutting according to the pattern of the customer's key.

Figure 47:
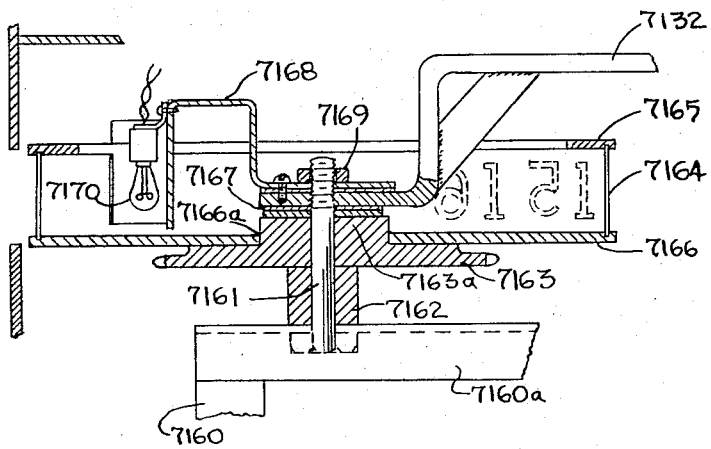
FIG. 47 is a vertical sectional view of the numbered dial, with parts in elevation, taken along the line 47—47 of FIG. 4.

The numbered dial is mounted and displayed as follows: A support 7160, FIG. 4, comprising a pair of spaced vertical posts are suitably fastened to the base plate 5010, the posts being connected at their upper ends by a transverse angle bar 7160a. A bolt 7161, FIG. 47, is passed upwardly through the upper flange of the bar 7160a. A spacer bushing 7162 rests on said upper flange, seated over said bolt, and a sprocket wheel 7163, having a hub portion 7163a is seated on said bushing. A numbered, circular translucent dial 7164, carried in upper and lower circular mounting plates 7165, 7166, respectively, is mounted over said sprocket, the lower plate 7166 having a circular opening 7166a, seated with a close, friction fit against the hub 7163a of the sprocket, so that when the sprocket is rotated, the dial will turn with it. A washer 7167 is seated on the hub 7163a around the bolt and the bracket 7032 extending from the key storage turret is seated on said washer. Another bracket 7168 is seated over the bolt 7161 and rests on the bracket 7132, all these parts being secured to the bolt by means of nut 7169. The sprocket 7030, FIGS. 2, 45, of the key storage turret, and the sprocket 7163 of the dial indicator, are connected by a chain belt 7071, FIG. 2. A light bulb 7170 is mounted behind and in close proximity to the dial and is illuminated when the machine is operated, as will be described.

*Electrical sequence*

Referring to the electrical diagram of FIG. 61, the circuitry is a matter of routine electrical design and power will be noted as supplied by lines $L_1$, $L_2$, the system synchronizing the working of the mechanical assemblies. The machine is set into operation by depositing a coin or coins in the coin slot 9000, FIGS. 1, 2, 3, which serves to close switch E (line 4). The closing of switch E energizes the relay M–1 (line 5) via the normally closed contact R–6A (line 5) and also lights the numeral light 7170, FIG. 47 (line 4). The push button selector light PB (line 5) is likewise lit, and the solenoid S–6 (line 9) which locks the indexing roller into the indexing notch 7021a of the disc plate 7021 is energized via the normally closed contact switch A (line 9) and and the normally closed contact (line 9) of the push button switch PB (line 6). The relay M–1 is locked in through its sealing contact $M_1$ (line 5). The contact $M_1$ (line 41) is closed to energize motor 5017 (line 40) which drives the machine except for the drive of the key storage turret, which is driven by the motor 7040 (line 44), and at this point the turret motor 7040 has not yet been energized.

The customer now presses the push button PB (line 6), which opens the circuit to solenoid S–6 (line 9), thereby releasing its locking effect on the key turret. This is accomplished by opening the normally closed contact (line 9) of the push button switch. Simultaneously, the normally open contact of that switch is closed to energize the relay M–2 (line 7). This will short out the selector light in line 5. Current for relay M–1 has been sustained through the sealing contact $M_1$ (line 5) and accordingly current for solenoid of relay M–2 comes through the now closed section of the push button switch (line 7), switch F, and now closes contact $M_1$ (line 5). Thus, the switch E is a momentarily closed switch actuated by coin insertion, and the switch F is a normally open switch maintained closed by the tracer bar at its rearward position shown in FIG. 33, which is its initial position, the machine having just been started.

Energization of the relay M–2 closes the contacts $M_2$ (line 44) to energize motor 7040, and accordingly, the key turret is set into rotation. Such rotation continues so long as push button PB is maintained depressed. The customer holds the push button depressed until he sees his selected numeral appear on the numeral selector dial 7164, FIG. 4. At that time he releases the push button and the turret ceases rotation. However, in the event that the turret is not at a true indexing (locked) position for dispensing of the key, the normally open contact of microswitch A (line 9) is maintained closed by the periphery of the turret disc plate 7021. This serves to maintain energization of the relay M–2 via the normally closed contact of the push button switch (line 9) and the closed contact $M_1$ (line 5). Thus, the turret motor 7040 will continue to rotate until roller 7051b, FIG. 13, controlled by switch A has dropped into the detent notch 7021a which is approaching it, thus permitting switch A to open its normally open contacts and to close its normally closed contacts. This closure energizes solenoid S–6 to actuate the detent 7057, FIG. 13, to lock the disc plate in position, and the blank key can then drop from the bottom of the selected column of the storage turret.

At this time the customer inserts his pattern or key into the key cylinder 4010, FIG. 7, and this insertion serves to close the normally open contact of the microswitch B (line 9) and to open the normally closed contact. The closure of the normally open contact energizes the solenoid S–1, which actuates the key clamp 4016 to clamp the customer's key. Such energization flows through the microswitch B and the closed contact $M_1$ (line 5). At the same time solenoid S–5 (line 13) is energized via the normally closed contact $R_5$ (line 19) microswitch B, and closed contact $M_1$ (line 5). Energization of solenoid S–5 actuates the clutch members 5025 and 5026, permitting the motor 5017 to drive the mechanism, except the blank key turret.

It will be understood, as mentioned above, that the tracer bar at this time is in its initial or starting position, with the sensing finger 5050 adjacent the nose, FIG. 33, of the key which has been inserted by the customer, this being referred to as the rear position for the tracer bar. Upon actuation of the clutch, the tracer bar is driven forwardly so that the sensing finger moves to the shoulder of the key, and upon arriving there the microswitch C (line 15) (FIGS. 15, 33), a normally open switch, is closed as it is contacted by the tracer bar. This serves to energize the relay R–1 (line 15) which locks in through its sealing contact $R_1$ (line 16), closing its contact $R_1$ (line 24). Energization for relay R–1 is via switch C, switch B, and closed contact $M_1$ (line 5).

In the course of this first traverse of the tracer bar, the key slide 7060 has moved rearwardly, FIG. 13, as hereinabove described, for the purpose of picking up a key from the turret. The effect of the closure of microswitch C sets up various conditions in the circuitry which do not come into play at this time save for energization of relay R–1, which is maintained energized at this time via the sealing contact $R_1$ (line 16), the normally closed contact $R_2$ of relay R–2 (line 17), the normally closed contact $R_3$, the normally closed contact $R_5$ (line 18), microswitch B (which was key operated to close its normally open contact) and finally the closed contact $M_1$ (line 5).

The tracer bar now automatically reverses its direction, going rearwardly, driven by the cam 5028, which permits switch C (FIG. 35) to open, without, however, deenergizing relay R–1. The energization of relay R–1 conditions the relay R–2 (line 19) to be energized at the end of the rearward traverse of the tracer bar, this being its second traverse.

At the end of such second traverse, the switch D is closed upon contact by the tracer bar, serving to energize relay R–2 via the now closed contact $R_1$ (line 24). Energization of relay R–2 passes through now closed contact $R_1$ (line 24), switch D, key operated switch B (normally open contact now closed), and the closed contact M–1 (line 5). Thus, closure of the normally open contact R–1 (6–8) (line 24), conditioned relay R–2 (line 19) to be subsequently energized, and this principle of conditioning subsequent relays is used in sequence in the operation of the circuit. In this second traverse, the tracer bar also closes switch F just before closing switch D (FIG. 33). The closure of switch F energizes solenoid S–6 to insure locking of the turret which might otherwise be driven due to drag of the turret clutch 7048, FIG. 14.

The foregoing energization of relay R–2 effects locking in through its sealing contact $R_2$ (line 18) and deenergization of relay R–1 upon opening of the normally closed $R_2$ contact (line 17). After deenergization of relay R–1, holding current for R–2 passes through contact $R_2$ (line 18), contact $R_3$ (line 18) (normally closed), R–5 (line 18), switch B, contact $M_1$ (line 5). The normally open contact $R_2$ (line 23) is now closed, while normally closed contact $R_2$ (same line) is opened. The closing of the first-mentioned contact conditions the circuit for energization of the relay R-3 (line 21) and the opening of the normally closed contact prevents energization of relay R-4 in the next sequence.

The third traverse of the tracer bar occurs now, this being a forward movement of the tracer bar until the sensing finger reaches the key shoulder, or substantially so, and switch C is once more closed to complete a circuit to relay R-2 via now closed contact R-2 (1-3) (line 23). Relay R-3 locks in through its sealing contacts R-3 (1-3). Energization for R-3 passes through the now closed normally open contact R-2 (1-3) (line 23) to switch C, to switch B and the still closed contact M-1 (line 5). Such energization opens normally closed contact $R_3$ (line 18) to deenergize relay R-2. Contact $R_3$ (line 25) is closed to energize solenoid S-2 (line 23), to actuate the mechanism for locking the blank key in position on the tracer bar. The closure of R-3 contact (line 29) conditions relay R-4 for subsequent energization. It will be noted that the solenoids S-2, S-3 and S-4 are in parallel with the relay R-3 and therefore are energized when that relay is energized. The timing of the machine mechanism as controlled by these solenoids is such that (1) the key blank is moved onto the tracer bar by solenoid S-3A, (2) is subsequently locked by solenoid S-2, and (3) solenoid S-3 then pulls the tracer bar into position so that the key blank may be engaged by the cutting wheel.

The tracer bar now begins its fourth traverse, this being rearward, during which traverse the blank is actually cut to the shape of the pattern by the cutting wheel, and at the end of which traverse the switch D (line 25) is once more closed. Closure of switch D at this time energizes relay R-4 via the contact $R_3$ (line 29). Energization for relay R-4 passes through the aforesaid contact and also through the normally closed contact $R_1$ (line 25), thence through switch D, switch B, and the still normally closed contact $M_1$. Relay R-4 locks in through its contacts 1-3, line 28, being thus in parallel with the relay R-3 which remains energized throughout the remainder of the cutting cycle. Relay R-4 contact 6-8 (line 28) is thus closed to condition relay R-5 (line 31) for energization upon the end of the next traverse.

The next traverse of the tracer bar, which is the fifth traverse, wherein the tracing bar once again moves forwardly, is likewise a cutting stroke, this being the second and final cutting stroke. At the end of such forward traverse, the switch C is once more closed to effect energization of relay R-5 via normally closed contact $R_2$ (line 23) and also via now closed contact $R_4$ (line 28). Relay R-5 locks in through its sealing contact $R_5$ (1-3) (line 18). The normally closed contact $R_5$ (line 18) is opened to deenergize solenoid S-5 and disengage the clutch. Once the clutch has been engaged by the solenoid, it will mechanically remain engaged by means of a cam plate 5028a (FIG. 62) attached to the end of cam 5028 until is completes a cycle or until the roller 5036 reaches the opening 5028b. Then the clutch mechanically releases by means of springs 5035.

The final and sixth traverse of the tracer bar is performed by the mechanism with the clutch solenoid deenergized, such traverse being rearward. Also, the opening of the normally closed contact $R_5$ (line 19) breaks the circuit to solenoids S-3, S-2 and S-3A, whence these solenoids are deenergized. Contact $R_5$, line 33, is closed, whereby upon the end of the sixth traverse the solenoid A of dual solenoid relay R-6, (line 33), is conditioned for energization. Such relay is energized upon closure of switch D. The ensuing closure of contact $R_{6A}$ (line 27) energizes the key ejecting solenoid S-4 (line 39) (FIG. 19) to eject the newly cut key, and also energizes a time delay relay TDR (line 37). Opening of the normally closed contact $R_{6A}$ (line 5) deenergizes the relay M-1 to open contact $M_1$ (line 5) which has remained closed throughout the sequence of traverse. At this time all circuits are deenergized except for the circuit to the time delay relay TDR. After a two second delay, the time delay relay closes its contact TDR (5-7) (line 35), which energizes the solenoid B of the latch relay R-6, restoring relay R-6 to its original condition with the contact $R_{6A}$ (line 37) open, and normally closed $R_{6A}$ contact (line 5) closed. The customer may now remove his key and his duplicate key, and the machine is ready for another cycle.

*Mechanical operation*

Figures 43, 44:
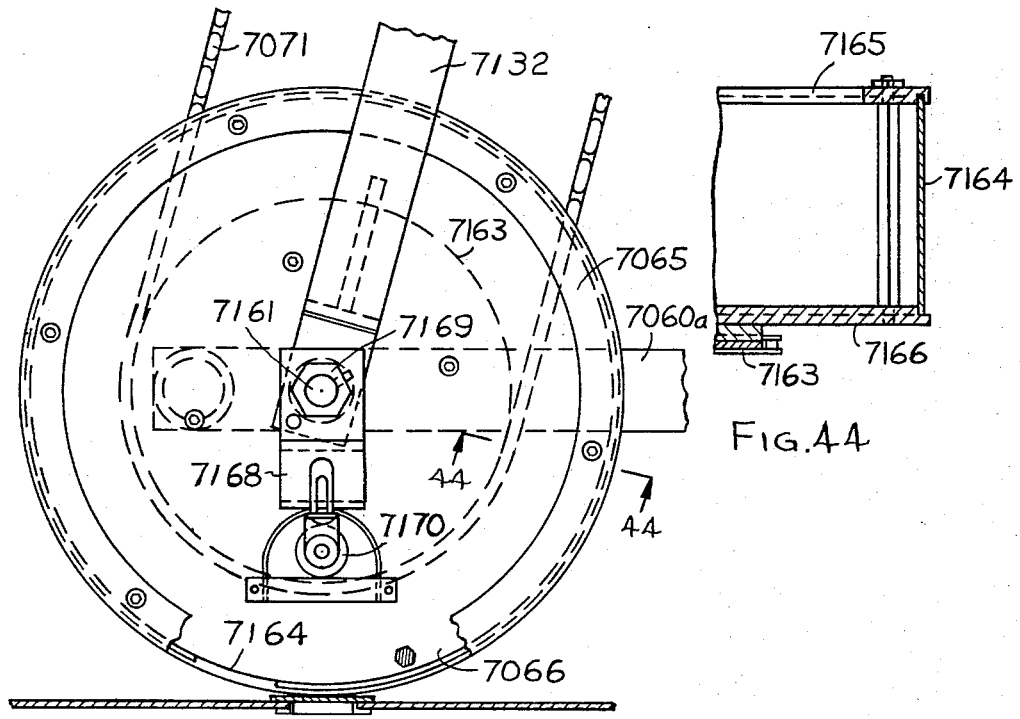
FIG. 43 is a detail in plan view of the key selector dial.
FIG. 44 is a sectional view taken along the line 44—44 of FIG. 43.
Figure 45:
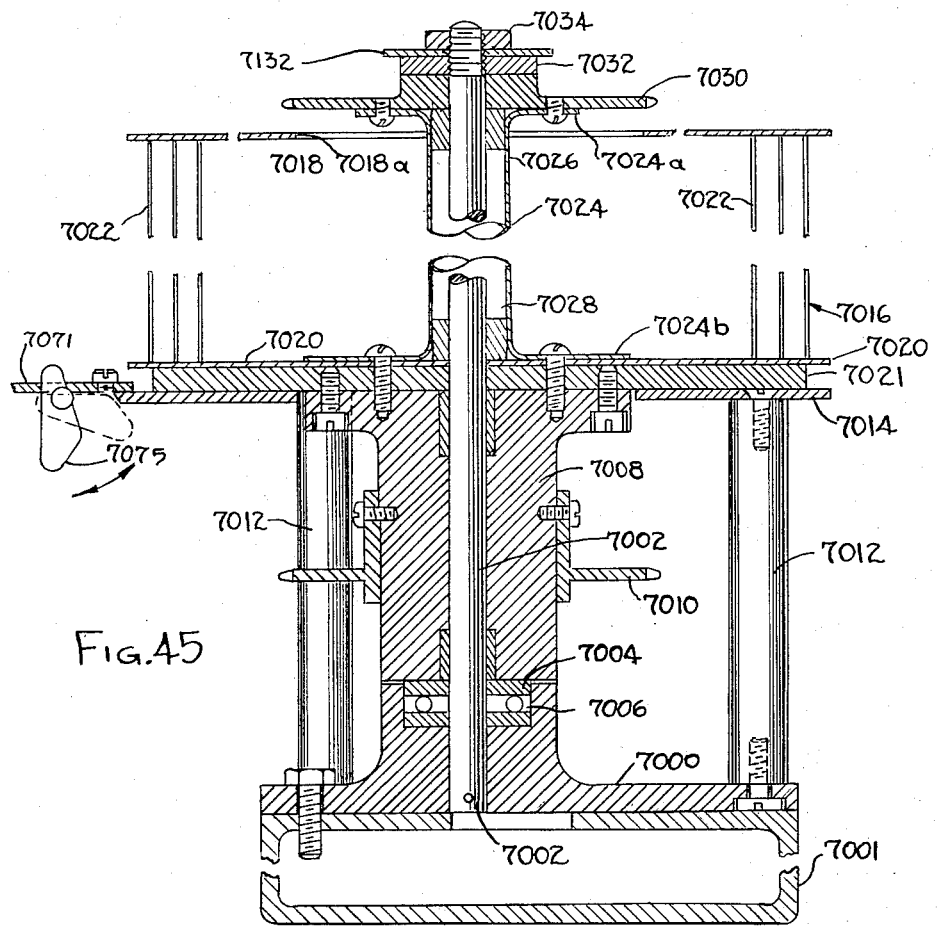
FIG. 45 is a vertical sectional view through the key turret support.

The operation of the machine is as follows: A customer desiring to cut a key would consult the key selector chart 4, FIG. 1, and as indicated in the chart above, would select a number on the chart corresponding to the key blank listed on the chart which fits his car. Having selected this number, the customer would then deposit the required coin, or coins, in the coin slot 9000 in the coin slide 9001, according to instructions which will appear on the face of the machine, and would push said slide into the machine, FIG. 3. An arm 9002 attached to the rear end of the coin slide will contact a microswitch E which closes a circuit to start motor 5017, FIG. 4, simultaneously energizing solenoid S-6, FIGS. 4, 13, to lock indexing roller 7057 into an indexing notch 7021a. The motor 5017, by means of belt 5018, also drives the pulley 5016, FIG. 4, 5, 6, rotating the cutter shaft 5014 and key cutter 5015, FIGS. 5, 6, which rotate continuously during the operating cycle. The light bulb 7170, FIGS. 43, 47, of the selector dial is also illuminated. The customer will now select his key blank by depressing the key selector push button PB, as shown in FIGS. 1 and 2, the push button containing a light bulb which is also lit by the closing of microswitch E.

The operation of the button PB deenergizes solenoid S-6, unlocking the blank key storage turret, and energizes turret motor 7040. FIGS. 4, 13, starting rotation of the turret and the dial 7164. When the number selected by the customer appears in the dial window 5, FIG. 1, he releases the push button PB. The release of the push button PB again energizes solenoid S-6, locking the turret by means of the indexing mechanism described. The key blank selected by the customer, stored in the turret, is now in a position to be delivered to the key slide and key cutter, as will appear. Should the push button be released before an indexing position is reached, that is, if the PB is released while the turret is rotating with the locking mechanism between indexing points, microswitch A reroutes the circuit to deenergize solenoid S-6 and keep motor 7040 energized until the turret reaches an indexing position. When an indexing position is reached, switch A drops out of the circuit.

The customer will now insert his key, which is to be duplicated, into the key slot, and will push the key cylinder rearward against spring 8001, FIGS. 7, 8, contacting microswitch B, energizing solenoid S-1, FIG. 4, actuating the key clamp 4016 to lock the key in the key slot. Microswitch B, FIG. 6, also energizes solenoid S-5, engaging the clutch members 5025 and 5026, FIG. 38, to rotate the cam 5028 to start movement of the tracer bar 5049.

The sensing finger 5050 of the tracer bar moves (first traverse) in a path forwardly, i.e., from the nose (FIG. 59) of the key to the shoulder of the key as its initial direction of motion, or from the 0° position to the 180° position, according to FIGS. 33, 34, but without contacting the key. The tracer bar 5049 and the key slide mechanism, FIGS. 21, 49, for delivering the key from the turret are both driven from the same cam slot 5029, each drive being taken off, respectively, from an opposite side of the cam, so that as the tracer bar moves in a forward direction, toward the shoulder of the key, the key slide, under its spring tension, moves in the rearward direction, towards the turret, to pick up a key. While the key slide is normally urged towards the turret by the springs 7068, FIGS. 21, 49, it is withdrawn from the turret by the cable 6014, FIG. 13, connected to the crank 6006, which is driven from the cam slot 5029.

Therefore, as the cam drives the sensing finger 5050 to the shoulder of the key, the cam, substantially simultaneously, allows the key slide to move under the turret to pick up a key. At this point in the operation, the finger 7076a of the arm 7076, FIGS. 21, 49, swings the detent 7075 around its pivot to allow the bar 7071 to swing away from the pawl 7069, the spring 7073 thereupon pulling the nose of the pawl into the edge of the key slide so that it slides along the edge of the key slide, ahead of the notch 7060c. The bar 7071 now lies over the detent and will remain in this position until next sequence, when the pawl 7069 will engage the notch 7060c. At the end of its forward travel, the tracer bar closes the microswitch C (FIGS. 33–36), which sets up a relay circuit for the next sequence of operation, as was shown and described in connection with the electrical circuit, FIG. 61.

With the key slide now under the turret to pick up a key K, which dropped by gravity from the turret into the key cutout of the slide, the tracer bar and sensing finger move (second traverse) to the rear of the machine, and the key slide and the duplicate key are moved forwardly, until the cutout in the key slide is over the key cutout in the plate 7014a. As the slide moved into position over the cutout, the pawl 7069 dropped into the notch in the edge of the slide, thus locking the slide against further key pick up until the present cycle is carried out. The key, resting head first, now drops, nose first, into the chute 7059, FIG. 23, because as the key moves over the slot in the plate 7014a, its head was supported by the tab 7061, which allowed the key to drop nose first and turn over as it fell into the chute, from which it is delivered onto the table 5049a of the tracer bar, nose first.

Substantitlly simultaneously with the dropping of the key, the tracer bar tripped microswitches F and D, the switch F being tripped momentarily ahead of switch D, the finger member F′ being extended further rearwardly than the finger member D′, FIG. 33. Switch F again energizes the solenoid S–6 to lock the turret, and switch D operates to set up a relay for the next sequence.

The tracer bar and sensing finger now move again (third traverse) to the shoulder of the key, and at the same time operate the yoke 7079, FIGS. 14, 19, 60, actuating the key pusher plate 5072, FIG. 51, to push the key blank into the key clamping 5053, where it will be clamped in cutting position in front of the cutter 5015. As the sensing finger reaches the shoulder of the key, it closes switch C to simultaneously perform four operations:

(1) It energizes the solenoid S–2, FIG. 5, which operates clamp 5053 to lock the blank key.
(2) It energizes solenoid S–3A, FIG. 5, which disengages the arm 7080 from its pad 7077a, FIG. 60, which permits the finger 5076a, FIG. 51, to remain engaged with the key blank during the cutting operation.
(3) It energizes S–3 to pull the tracer arm 5049 over on its pivot 5044, FIGS. 39, 41, to present the key blank to the cutter and to present the sensing finger to the customer's pattern key, FIG. 34.
(4) It sets up a relay for the next sequence.

The tracer bar now returns (fourth traverse) to the rear position, cutting the key (first cut) on its return path; again stroking microswitch F to lock the turret, and microswitch D to set up the next electrical sequence.

The tracer bar again returns to the forward position (fifth traverse), cutting the key on this second and final cutting pass, and at the forward position the switch C is closed to accomplish the following four steps:

(1) Sets up relay R–1 for the next electrical sequence.
(2) Deenergizes solenoid S–3, allowing tracer bar to swing away from the tracing and cutting position.
(3) Solenoid S–3A is deenergized, allowing the bar 7080, FIG. 60, to return to its position in operative relation to the push pad 7077a.
(4) Solenoid S–2 is deenergized, releasing the clamp 5053, FIG. 5, holding the duplicate key blank.

The tracer bar returns to the rear position (sixth traverse) for the last time, during which the completed duplicate key is withdrawn from the clamp 5053 by the finger 5076a and moved into position over the table 5049a, where it rests on the ejecting arms 5065b and 5065c. At this rear position, the tracer bar closes microswitches F and D for the last time, microswitch F again locking the turret as heretofore described, with microswitch D setting up the last and final electrical sequence. Solenoid S–4, FIG. 5, is energized, pulling spring 5065c, FIG. 19, link 5065d, and lug 5065b of ejecting table 5065, FIG. 51, to raise the arms 5065b and 5065c to eject the duplicate key into the chutes 5095 and 5096, FIGS. 14, 19, 20, for delivery to the customer. Solenoid S–4 also pulls on cable 7070, FIG. 19, to pull release arm 7071, FIG. 21, towards the key slide, disengaging the pawl from the key slide, and releasing the detent 7075 which drops by gravity to lock the bar 7071 against the pawl to keep the pawl disengaged from the notch in the key slide, thereby fixing the key slide in its starting position for operation by the next customer.

A time delay relay (see electrical circuit) maintains all working circuits for two seconds until the duplicate key is ejected, at which time the time delay relay deenergizes all circuits, permitting removal of the customer's key from its clamp, completing the cycle of operation and neutralizing the machine for the next customer.

Throughout the specification and claims, the word "key" is used for convenience of description only, and it is to be considered and interpreted to be synonymous with "workpiece" or "template."

Changes in construction and design may be made without departing from the spirit of the invention as defined by the appended claims.

We claim:
1. A machine for pattern duplication comprising
(a) a pattern receiving and clamping means for receiving and clamping a pattern of which a duplicate is to be made;
(b) workpiece storing means for storing the work from which duplicates are to be made;
(c) means movable between said clamping and receiving means and said storing means for engaging and sensing said pattern, said means comprising a sensing finger at one end and a second clamping means adjacent the other end for receiving a workpiece from said storing means and for clamping same;
(d) pattern cutting means fixed adjacent said workpiece clamp;
(e) means for delivering a workpiece from said storing means to said second clamping means on said movable means, said movable means enabling relative motion to take place between said sensing finger and pattern receiving means on the one hand, and effecting identical motion between said work clamping means and said pattern cutting means on the other hand; and
(f) automatic means for operating said clamping means, delivery means, cutter means and movable means after a pattern has been received in said key receiving means to cause said movable means carrying said sensing finger and workpiece clamp to engage respectively with said pattern and cutter to follow the contour of said pattern and to cut an identical contour in said workpiece clamped in said workpiece clamp.

2. A machine according to claim 1 in which said movable means comprises an elongated bar slidable between said pattern receiving and clamping means and said storing means, and pivotable towards and away from said cutting means.

3. A machine according to claim 1 in which said delivering means comprises a slide movable in response to reciprocable movements of said movable means, and means responsive to the movements of said movable means to lock and unlock said slide against movement during further reciprocable movements of said movable means.

4. A machine according to claim 1 in which said movable means is reciprocable, means connecting said movable means and said delivery means so that they move simultaneously in opposite directions, and means responsive to the movements of said movable means for engaging and disengaging said slide from said movable means.

5. A machine according to claim 1 in which said movable means includes work ejecting means adjacent said second clamping means.

6. A machine according to claim 1 including a key blank receiving table at one end of said movable means, key engaging means on said table for gripping and moving a key blank into and out of said second clamping means, said engaging means being operable by said movable means, means adjacent said second clamping means and disposed in the path of said key engaging means for ejecting the blank key at the conclusion of the cutting thereof, said engaging means being operable by said movable means, and means responsive to the movements of said movable means for engaging and disengaging said key engaging means from said movable means.

7. A machine according to claim 1, including a key blank receiving table at one end of said movable means, key engaging means on said table for gripping and moving a key blank into and out of said second clamping means, said engaging means being operable by said movable means, and means responsive to the movements of said movable means for engaging and disengaging said key engaging means from said movable means.

8. A machine according to claim 1, in which said movable means is reciprocable, including a key blank receiving table at one end of said movable means, key engaging means on said table for gripping and moving a key blank into and out of said second clamping means, means controlling said key engaging means and disposed in the path of said movable means for driving said key engaging means towards or away from said second clamping means, said controlling means being movable into and out of operative engagement with said movable means responsive to said reciprocable movements.

9. A machine according to claim 1, in which said pattern receiving and clamping means comprises a member having a slot for receiving the body of a pattern, and a clamp on said member for clamping said pattern, said clamp being arranged with a jaw on each side of said slot, and means responsive to the insertion of a pattern in said slot for actuating said clamp to lock said pattern.

10. A machine according to claim 1, in which said pattern receiving and clamping means comprises a member having a slot for receiving the body of said pattern and having a recess therein transversely of said slot, a clamp comprising a jaw pivoted in said recess on one side of said slot, the body of said member on the other side of said slot forming the other jaw of said clamp, means supported by said member for guiding said pattern into said slot.

11. A machine according to claim 1, in which said pattern receiving and clamping means comprises a member having a slot for receiving the body of said pattern and a clamp on said member for clamping said pattern, means extending over said slot to retain said pattern in said slot, said means being movable out of said position over said slot as said sensing finger moves into engagement with said pattern, and means for restoring said retaining means over said slot as said sensing finger moves away from said pattern.

12. A coin controlled key duplicating machine comprising, in combination,
   (a) key receiving means for receiving and clamping a key of which a duplicate is to be made, and
   (b) key cutting means,
   (c) a tracer member having a control stylus at one end and blank key clamping means at the other end, said tracer member being movable laterally and longitudinally with respect to said first clamping means and said cutting means,
   (d) said control stylus being positioned to engage a key in said first clamping means and said blank clamping means being positioned to move adjacent said key cutting means,
   (e) means for mounting said tracer member to enable relative motion to take place between said stylus and said first clamping means, said mounting means enabling identical relative motion to take place simultaneously between said second clamping means and said key cutting means,
   (f) motor means responsive to the deposit of a coin to energize same for driving said tracer member, and
   (g) automatic means for actuating said both clamping means, key cutting means, tracer member and mounting means after a coin has been received in said machine and after a key has been received in said first key receiving clamp, to cause said stylus to follow the indentations of a key received in said key receiving means, and through said tracer member and mounting means, effect identical indentations in a blank key clamped on said tracer member.

13. A coin controlled key duplicating machine comprising, in combination,
   (a) key receiving means for receiving and clamping a key of which a duplicate is to be made,
   (b) blank key cutting means,
   (c) a tracer member having a control stylus at one end and blank key receiving and clamping means at the other end, said tracer member being movable laterally and longitudinally with respect to said first clamping means and said cutting means, said control stylus being positioned to engage a key in said first clamping means and said blank key clamping means being positioned to simultaneously move adjacent said cutting means,
   (d) selectively rotatable blank key storage means having facility for storing a plurality of differing key blanks,
   (e) a key slide member comprising means movable between said storage means and said blank key receiving means of said tracer member to remove a blank key from said storage means, deposit said key on the key receiving portion of said tracer member and feed said blank to said second clamping means,
   (f) means for mounting said tracer member to enable relative motion to take place between said stylus and said first clamping means, said mounting means enabling identical relative motion to take place simultaneously between said second clamping means and said key cutting means,
   (g) motor means responsive to the deposit of a coin to energize same for driving said tracer member and slide member,
   (h) switch means selectively operable to initiate rotation of said storage means to present a selected key blank for delivery to said slide, said switch means being operable to lock said storage means in selected delivery position, and
   (i) automatic means for actuating said both clamping means, key cutting means, tracer member, mounting means and key slide member after a coin has been received in said machine and after a key has been received in said first key receiving clamp, to cause said stylus to follow the indentations of a key received in said key receiving means, and through said tracer member and mounting means effect identical indentations in a blank key clamped on said tracer member.

14. A key duplicating machine comprising in combination: a pattern key receiving means and means for clamping in said means a pattern key of which a duplicate is to be made, duplicate key receiving means and means for clamping a duplicate blank key thereon, key cutting means fixed with respect to said last mentioned means in a position adjacent said duplicate key clamping means, means for driving said cutting means, a control stylus positioned to engage said pattern key in said receiving means, common mounting means for said stylus and said duplicate key receiving and clamping means enabling identical relative motion to take place between said stylus and said key receiving means on the one hand, and between said duplicate key receiving means and said cutting means, respectively, on the other hand, said stylus being supported on one end of said mounting means and said duplicate key receiving means being supported on the other end of said mounting means, said means for driving said cutting means also driving said mounting means, and automatic means for actuating said pattern key clamping means and said duplicate key clamping means and cutting means after a pattern key has been received in said key receiving means to cause said stylus to follow the indentations in said pattern key and through said mounting means to effect a cutting of a duplicate pattern of indentations in said duplicate key blank.

References Cited
UNITED STATES PATENTS

| | | | |
|---|---|---|---|
| 2,645,978 | 7/1953 | Sejarto et al. | 90—13.05 |
| 3,138,999 | 6/1964 | Haggstrom | 90—13.05 |

GERALD A. DOST, *Primary Examiner.*